US012543760B2

(12) United States Patent
Tsukamoto

(10) Patent No.: US 12,543,760 B2
(45) Date of Patent: Feb. 10, 2026

(54) VEGETABLE PROTEIN BINDER, CHUNK MEAT-LIKE MEAT ALTERNATIVE, AND METHOD OF PRODUCING CHUNK MEAT-LIKE MEAT ALTERNATIVE

(71) Applicant: FUJIFILM CORPORATION, Tokyo (JP)

(72) Inventor: Naoki Tsukamoto, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/539,307

(22) Filed: Dec. 14, 2023

(65) Prior Publication Data

US 2024/0114923 A1  Apr. 11, 2024

Related U.S. Application Data

(63) Continuation of application No. PCT/JP2023/009451, filed on Mar. 10, 2023.

(30) Foreign Application Priority Data

Mar. 15, 2022  (JP) .............................. 2022-040837

(51) Int. Cl.
| | |
|---|---|
| *A23J 3/22* | (2006.01) |
| *A23J 3/16* | (2006.01) |
| *A23J 3/18* | (2006.01) |
| *A23L 29/00* | (2016.01) |
| *A23L 29/256* | (2016.01) |

(52) U.S. Cl.
CPC ............... *A23J 3/227* (2013.01); *A23J 3/16* (2013.01); *A23J 3/18* (2013.01); *A23L 29/015* (2016.08); *A23L 29/256* (2016.08)

(58) Field of Classification Search
None
See application file for complete search history.

(56) References Cited

U.S. PATENT DOCUMENTS

| | | | | |
|---|---|---|---|---|
| 4,276,311 A | * | 6/1981 | Burrows ................ | A23K 50/48 |
| | | | | 426/805 |
| 4,423,083 A | * | 12/1983 | Shenouda ................ | A23J 3/24 |
| | | | | 426/802 |
| 6,458,395 B1 | | 10/2002 | Emoto | |
| 2004/0241306 A1 | | 12/2004 | Blindt et al. | |
| 2008/0287300 A1 | | 11/2008 | Kopesky et al. | |
| 2013/0171317 A1 | | 7/2013 | Chang et al. | |
| 2014/0154390 A1 | | 6/2014 | Rayner et al. | |
| 2015/0351427 A1 | | 12/2015 | Rose et al. | |
| 2018/0014567 A1 | | 1/2018 | Finnigan et al. | |
| 2023/0080653 A1 | | 3/2023 | Finnigan et al. | |

FOREIGN PATENT DOCUMENTS

| | | | |
|---|---|---|---|
| CN | 1284838 A | 2/2001 | |
| CN | 1770983 A | 5/2006 | |
| CN | 101662946 A | 3/2010 | |
| CN | 105188398 A | 12/2015 | |
| CN | 107427058 A | 12/2017 | |
| CN | 113040273 A | 6/2021 | |
| EP | 1759593 A1 * | 3/2007 | ............... A23J 3/08 |
| JP | 2003-180265 A | 7/2003 | |
| JP | 2009213356 A * | 9/2009 | |
| JP | 2013-138670 A | 7/2013 | |
| JP | 2016-010358 A | 1/2016 | |
| JP | 2016-163548 A | 9/2016 | |
| JP | 2018-506300 A | 3/2018 | |
| WO | WO-2020236632 A1 * | 11/2020 | ............... A23J 3/14 |
| WO | 2021/095034 A1 | 5/2021 | |

OTHER PUBLICATIONS

FOR Translation JP2016163548A (Year: 2016).*
Jim Smith, "Food Additives User's Handbook", 1991, Springer Science +Business Media Publication, pp. 273-279. (Year: 1991).*
International Search Report issued in International Application No. PCT/JP2023/009451 on May 16, 2023.
Written Opinion of the ISA issued in International Application No. PCT/JP2023/009451 on May 16, 2023.
English language translation of the following: Office action dated Jan. 23, 2024 from the JPO in a Japanese patent application No. 2023-566748 corresponding to the instant patent application.
English language translation of the following: Office action dated Dec. 6, 2024 from the SIPO in a Chinese patent application No. 202380027802.9 corresponding to the instant patent application. This office action translation is submitted now in order to supplement the understanding of the cited references which are being disclosed in the instant Information Disclosure Statement.
Database GNPD [Online] MINTEL; Jan. 27, 2022, anonymous: "Chicken Style Vegan Cold Cuts", XP093250369, Database accession No. 9338014.
Database GNPD [Online] MINTEL; Aug. 26, 2020, anonymous: "Plant Based Crunchy Chicken Schnitzel", XP093250438, Database accession No. 8055307.
Database GNPD [Online] MINTEL; Oct. 18, 2006, anonymous: "Curried Meat Substitutes", XP093250439, Database accession No. 601591.
Database GNPD [Online] MINTEL; Jun. 23, 2021, anonymous: "Vegan Cordon Blue", XP093250414, Database accession No. 8806987.
Database GNPD [Online] MINTEL; Dec. 21, 2021, anonymous: "No Chicken Pieces", XP093250371, Database accession No. 9256738.
Database GNPD [Online] MINTEL; Feb. 3, 2021, anonymous: "Vegan Nuggets", XP093250373, Database accession No. 8450335.
Database GNPD [Online] MINTEL; Nov. 25, 2021, anonymous: "No Chicken Tikka Pieces", XP093250395, Database accession No. 9169058.

(Continued)

*Primary Examiner* — Jyoti Chawla
(74) *Attorney, Agent, or Firm* — SOLARIS Intellectual Property Group, PLLC

(57) ABSTRACT

A vegetable protein binder contains: a polysaccharide including a thermally irreversible gel-forming polysaccharide and a thermally reversible gel-forming polysaccharide; and a gelation retardant.

6 Claims, 6 Drawing Sheets

(56) References Cited

OTHER PUBLICATIONS

Grabowska Katarzyna J et al, "Shear-induced structuring as a tool to make anisotropic materials using soy protein concentrate", Journal of Food Engineering, Elsevier, Amsterdam, NL, vol. 188, pp. 77-86, Elsevier, May 13, 2016.
Krintiras Georgios A. et al., "On the use of the Couette Cell technology for large scale production of textured soy-based meat replacers", Journal of Food Engineering, vol. 169, pp. 205-213, Elsevier, Jan. 1, 2016.
Mcclements David Julian et al., "The science of plant-based foods: Constructing next-generation meat, fish, milk, and egg analogs", Comprehensive Reviews in Food Science and Food Safety, vol. 20, No. 4, pp. 4049-4100, May 30, 2021, Retrieved from the Internet: URL:https://onlinelibrary.wiley.com/doi/full-XML/10.1111/1541-4337.12771>.
Extended European Search Report dated Mar. 5, 2025, issued in corresponding EP Patent Application No. 23770698.1.
Srinivasan, Damodaran et al. "Fennema's Food Chemistry", 5th Edition, China Light Industry Press, Dec. 2020, p. 726-727.
English language translation of the following: Office action dated Apr. 3, 2025 from the SIPO in a Chinese patent application No. 202380027802.9 corresponding to the instant patent application. This office action translation is submitted now in order to supplement the understanding of the cited reference which is being disclosed in the instant Information Disclosure Statement.
English language translation of the following: Decision of Refusal dated Jun. 11, 2025 from the SIPO in a Chinese patent application No. 202380027802.9 corresponding to the instant patent application.

\* cited by examiner

VEGETABLE PROTEIN BINDER, CHUNK MEAT-LIKE MEAT ALTERNATIVE, AND METHOD OF PRODUCING CHUNK MEAT-LIKE MEAT ALTERNATIVE

CROSS-REFERENCE TO RELATED APPLICATIONS

This application is a continuation application of International Application No. PCT/JP2023/009451, filed Mar. 10, 2023, the disclosure of which is incorporated herein by reference in its entirety. Further, this application claims priority from Japanese Patent Application No. 2022-040837, filed Mar. 15, 2022, the disclosure of which is incorporated herein by reference in its entirety.

TECHNICAL FIELD

The present disclosure relates to a vegetable protein binder, a chunk meat-like meat alternative, and a method of producing a chunk meat-like meat alternative.

BACKGROUND ART

Livestock meat is a food material widely consumed in the world. However, from the viewpoint of environmental protection and maintaining health, attempts have been made to refrain from intake of livestock meat and to intake meat-like food (hereinafter, also referred to as "meat alternative") using a vegetable protein derived from a plant such as soybean as a raw material. Accordingly, raw materials suitable for processing vegetable proteins have been developed.

For example, Japanese Patent Application Laid-Open (JP-A) No. 2009-213356 proposes "a protein material obtained by combining a vegetable protein with one or more of sodium alginate, konjac mannan, agar, carrageenan, locust bean gum, tara gum, tamarind gum, and pectin, which are water-soluble polysaccharides, and subjecting the formulation to a pressure heat treatment at a water content of from 20 wt % to 80 wt % and a pressure of from 0.5 MPa to 3.0 MPa".

Japanese National-Phase Publication (JP-A) No. 2018-506300 proposes "an edible formulation containing edible filamentous fungus particles and calcium ions".

Japanese Patent Application Laid-Open (JP-A) No. 2016-163548 proposes "a gelling agent-containing composition containing a thermally reversible gelling agent, a thermally irreversible gelling agent, and a sodium chloride, in which $0.30 \leq B/A \leq 2.30$, $0.50 \leq A+B \leq 1.40$, and $2.0 \leq C \leq 4.0$, in which A (w/w %) is a content of the thermally reversible gelling agent, B (w/w %) is a content of the thermally irreversible gelling agent, and C (w/w %) is a content of the sodium chloride".

Japanese Patent Application Laid-Open (JP-A) No. 2016-010358 proposes "a gel-like food containing an ingredient, a heat-resistant first gel, and a heat-reversible second gel, in which the gel-like food fills into a container in a heat-treated state, and the gel-like food has spreadability".

Japanese Patent Application Laid-Open (JP-A) No. 2003-180265 proposes "a method of producing a heat-resistant gel-like food, the method including: heating and dissolving a gelling agent having a property of reacting with cations to form a gel and a gelling agent having a cooling gelation property without reacting with cations, and then cooling the gelling agents to form a gelled product; and molding the obtained gelled product into an appropriate size, if necessary, and immersing the obtained gelled product in a solution containing cations for further promote gelation".

SUMMARY OF INVENTION

Technical Problem

In a meat alternative or the like using a vegetable protein as a raw material, a polysaccharide may be used as a binder having moldability during molding. In a case in which a polysaccharide is used as a binder, a binder capable of maintaining a gel state even when a heat treatment is performed is generally used from the viewpoint of maintaining the shape of the meat alternative. In this case, it is preferable to increase a concentration of the binder in the gel in order to make a texture of a chunk meat-like meat alternative after cooking close to that of livestock meat. However, the binder capable of maintaining a gel state even when a heat treatment is performed may have low solubility, the concentration of the binder in the gel cannot be increased, and even when the binder is mixed at a high concentration, the binder becomes brittle and does not provide a texture of livestock meat in some cases. Therefore, there is a demand for a binder that has moldability, maintains a shape of a chunk meat-like meat alternative by performing a heat treatment, and can provide a chunk meat-like meat alternative having a texture close to a texture of livestock meat after cooking.

In order to solve the above-described problems, an embodiment of the disclosure is to provide a vegetable protein binder that has moldability, maintains a shape of a chunk meat-like meat alternative by performing a heat treatment, and can provide a chunk meat-like meat alternative having a texture close to a texture of livestock meat after cooking, and to provide a chunk meat-like meat alternative and a method of producing a chunk meat-like meat alternative.

Solution to Problem

Means for solving the above-described problems include the following embodiments.

<1> A vegetable protein binder containing:
   a polysaccharide including a thermally irreversible gel-forming polysaccharide and a thermally reversible gel-forming polysaccharide; and
   a gelation retardant.

<2> The vegetable protein binder according to <1>, in which the thermally irreversible gel-forming polysaccharide is at least one selected from the group consisting of alginic acid and pectin.

<3> The vegetable protein binder according to <1> or <2>, in which the gelation retardant is a chelating agent.

<4> The vegetable protein binder according to <3>, in which the chelating agent is pyrophosphate.

<5> The vegetable protein binder according to any one of <1> to <4>, in which the thermally reversible gel-forming polysaccharide is carrageenan.

<6> The vegetable protein binder according to any one of <1> to <5>, in which the vegetable protein binder is used for a fiber bundle-shaped textured protein.

<7> The vegetable protein binder according to <6>, in which the vegetable protein binder is used for a fibrous fiber bundle-shaped textured protein.

<8> A chunk meat-like meat alternative containing a vegetable protein and the vegetable protein binder according to any one of <1> to <7>.

<9> The chunk meat-like meat alternative according to <8>, in which the vegetable protein is a fiber bundle-shaped textured protein, and a fiber axis direction of the fiber bundle-shaped textured protein is oriented in one direction.

<10> The chunk meat-like meat alternative according to <8> or <9>, in which a content of the polysaccharide is 3% by mass or more with respect to an entirety of the chunk meat-like meat alternative.

<11> The chunk meat-like meat alternative according to any one of <8> to <10>, in which the chunk meat-like meat alternative contains a water-in-oil emulsion.

<12> A method of producing a chunk meat-like meat alternative, the method including:
mixing a fiber bundle-shaped textured protein and the vegetable protein binder according to any one of <1> to <7> to obtain a mixture; and
stretching the mixture to obtain a stretched mixture, in which a fiber axis direction of the fiber bundle-shaped textured protein is oriented in one direction.

Advantageous Effects of Invention

According to the disclosure, there are provided a vegetable protein binder that has moldability, maintains a shape of a chunk meat-like meat alternative by performing a heat treatment, and can provide a chunk meat-like meat alternative having a texture close to a texture of livestock meat after cooking, a chunk meat-like meat alternative, and a method of producing a chunk meat-like meat alternative.

DESCRIPTION OF EMBODIMENTS

Figure 1:
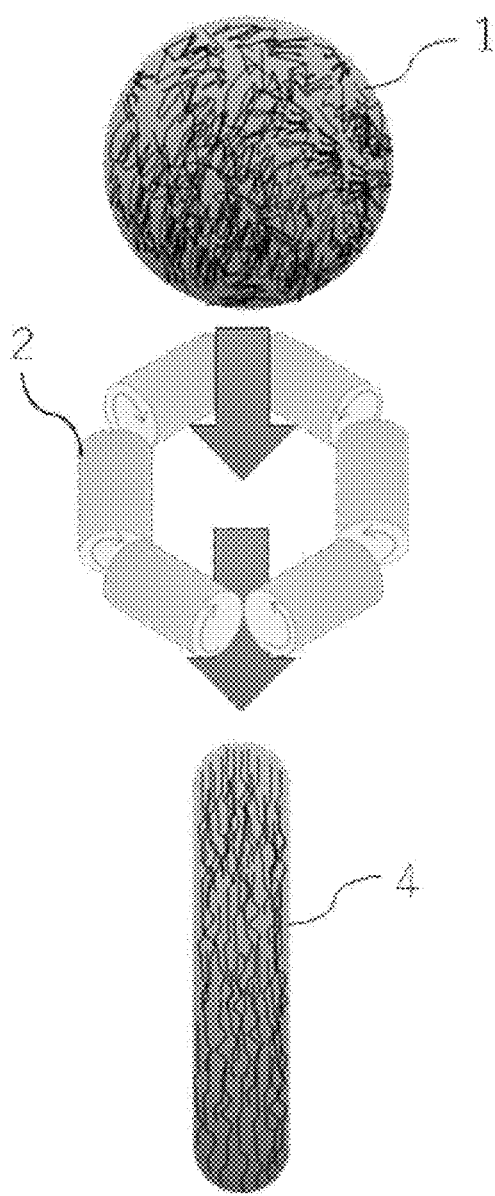
FIG. 1 is a schematic perspective view showing an example of an arrangement mode of a set of rollers.

Hereinafter, embodiments that are examples of the disclosure will be described. These descriptions and examples illustrate embodiments and do not limit the scope of the invention.

With regard to the stepwise numerical ranges described in the disclosure, the upper limit value or the lower limit value described in one numerical range may be replaced with the upper limit value or the lower limit value of another stepwise numerical range. In the numerical ranges described herein, upper limit values or lower limit values of the numerical value ranges may be replaced with values described in Examples.

Each component may contain a plurality of kinds of corresponding substances.

In a case in which a plurality of kinds of substances corresponding to each component are present in a composition, unless otherwise specified, the amount of each component in the composition means the total amount of the plurality of substances present in the composition.

The term "step" includes not only an independent step, but also a step that can achieve a predetermined action of the step even in the case of being not clearly distinguished from other steps.

Herein, a combination of two or more preferred aspects is a more preferred aspect.

Components denoted by the same reference signs in each of the drawings mean the same components.

<Vegetable Protein Binder>

A vegetable protein binder according to the disclosure contains a polysaccharide including a thermally irreversible gel-forming polysaccharide and a thermally reversible gel-forming polysaccharide, and a gelation retardant.

Due to the above-described configuration, the vegetable protein binder according to the disclosure becomes a vegetable protein binder that has moldability, maintains a shape of a chunk meat-like meat alternative by performing a heat treatment, and can provide a chunk meat-like meat alternative having a texture close to a texture of livestock meat after cooking. The reason is presumed as follows.

In a case in which a thermally irreversible gel-forming polysaccharide is contained, a state of a gel containing the thermally irreversible gel-forming polysaccharide is maintained even after cooking. In a case in which a thermally reversible gel-forming polysaccharide is contained, a texture of a chunk meat-like meat alternative after cooking is close to a texture of livestock meat. In a case in which a gelation retardant is contained, formation of a gel containing a polysaccharide can be retarded before cooking. As a result, it is possible to easily form a chunk meat and increase unity at the time of molding, and it is possible to improve an appearance and a texture of a chunk meat-like meat alternative.

(Thermally Irreversible Gel-Forming Polysaccharide)

The vegetable protein binder according to the disclosure contains a thermally irreversible gel-forming polysaccharide.

A thermally irreversible gel is a gel that maintains a state thereof even when heated once the gel is formed.

In the disclosure, the "gel" refers to a gel that contains at least water and a thermally irreversible gel-forming polysaccharide and exhibits a behavior as an elastic solid.

The thermally irreversible gel-forming polysaccharide is a polysaccharide that forms a thermally irreversible gel.

As the thermally irreversible gel-forming polysaccharide, a polysaccharide that is crosslinked by a reaction with a cation is preferable from the viewpoint of solubility before gelation.

The cation as a gelling agent is preferably a metal ion having an ionic valence of 2 or higher.

Examples of the metal ion include divalent metal ions such as a calcium ion, a magnesium ion, an iron(II) ion, a copper(II) ion, a zinc ion, and a manganese ion; and trivalent metal ions such as an aluminum ion and an iron(III) ion.

From the viewpoint of obtaining a stable crosslinked structure, the metal ion is preferably at least one selected from a calcium ion, a magnesium ion, or a zinc ion, and more preferably a calcium ion.

Examples of the thermally irreversible gel-forming polysaccharide include a polysaccharide having at least one selected from the group consisting of a carboxy group, a carboxylic acid anion group (—COO$^-$), a sulfo group, and a sulfonic acid anion group (—SO$_3^-$).

Examples of the thermally irreversible gel-forming polysaccharide include alginic acid, low methoxyl (LM) pectin, and low acyl (LA) gellan gum.

From the viewpoint of improving moldability and heat resistance of a gel, the thermally irreversible gel-forming polysaccharide is preferably at least one selected from the group consisting of alginic acid and pectin.

A viscosity of an aqueous solution containing 1% by mass of the thermally irreversible gel-forming polysaccharide (an aqueous solution containing 1% by mass of the thermally irreversible gel-forming polysaccharide with respect to an entirety of the aqueous solution) is preferably from 10 mPa·S to 3,000 mPa·S, and more preferably from 20 mPa·S to 1,000 mPa·S.

The viscosity of the aqueous solution containing 1% by mass of the thermally irreversible gel-forming polysaccharide is a value measured by a tuning fork vibration type viscometer under a temperature condition of 20° C.

As the tuning fork vibration type viscometer, for example, SV-10 (manufactured by A&D Company, Limited) can be used.

A content of the thermally irreversible gel-forming polysaccharide is preferably from 10% by mass to 90% by mass, more preferably from 20% by mass to 80% by mass, and still more preferably from 30% by mass to 70% by mass, with respect to an enthrety of the vegetable protein binder.

(Thermally Reversible Gel-Forming Polysaccharide)

The vegetable protein binder according to the disclosure contains a thermally reversible gel-forming polysaccharide.

A thermally reversible gel is a gel that maintains a state thereof (in this paragraph, the term "gel" refers to a gel that contains at least water and a thermally reversible gel-forming polysaccharide and exhibits a behavior as an elastic solid) at room temperature (25° C.) and is melted and liquefied (solated) when heat is applied.

The thermally reversible gel-forming polysaccharide is a polysaccharide that forms a thermally reversible gel.

Examples of the thermally reversible gel-forming polysaccharide include agar, carrageenan, furcellan, native gellan gum, locust bean gum, xanthan gum, guar gum, *psyllium* seed gum, glucomannan, tara gum, and tamarind seed gum.

The thermally reversible gel-forming polysaccharide is preferably carrageenan from the viewpoint of maintaining the shape of the meat alternative after cooking and the texture.

A content of the thermally reversible gel-forming polysaccharide is preferably from 10% by mass to 90% by mass, more preferably from 20% by mass to 80% by mass, and still more preferably from 30% by mass to 70% by mass, with respect to an entirety of the vegetable protein binder.

(Combination of Thermally Irreversible Gel-Forming Polysaccharide and Thermally Reversible Gel-Forming Polysaccharide)

Examples of a preferred combination of the thermally irreversible gel-forming polysaccharide and the thermally reversible gel-forming polysaccharide include a combination in which a thermally irreversible gel-forming polysaccharide is at least one selected from the group consisting of alginic acid and pectin and a thermally reversible gel-forming polysaccharide is carrageenan.

(Gelation Retardant)

The vegetable protein binder according to the disclosure contains a gelation retardant.

The gelation retardant is a compound having a function of suppressing gelation of a thermally irreversible gel-forming polysaccharide or a thermally reversible gel-forming polysaccharide.

The gelation retardant is preferably a compound having a function of suppressing gelation of a thermally irreversible gel-forming polysaccharide from the viewpoint of maintaining the shape of the meat alternative after cooking and the texture.

The gelation retardant is preferably a chelating agent from the viewpoint of maintaining the shape of the meat alternative after cooking and the texture.

As the chelating agent, a known chelating agent can be suitably used.

Examples of the chelating agent include: oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); condensed phosphoric acids such as pyrophosphoric acid and tripolyphosphoric acid; and salts thereof.

Among them, the chelating agent is preferably condensed phosphoric acid or a salt thereof, and more preferably pyrophosphoric acid or pyrophosphate, from the viewpoint of maintaining the shape of the meat alternative after cooking and the texture and the viewpoint of the flavor of the meat alternative.

A content of the gelation retardant is preferably from 0.1% by mass to 20% by mass, more preferably from 0.5% by mass to 15% by mass, and still from 0.3% by mass to 10% by mass, with respect to an entirety of the polysaccharide including the thermally irreversible gel-forming polysaccharide and the thermally reversible gel-forming polysaccharide.

(Use)

The vegetable protein binder according to the disclosure is suitable for use in binding a food material containing a vegetable protein.

The vegetable protein is a protein collected from a plant.

The vegetable protein is not particularly limited as long as the vegetable protein is a protein collected from a plant. Examples of the origin of the vegetable protein include: cereals such as wheat, barley, oats, rice, and corn; beans such as soybean, pea, red bean, chickpea, lentil, broad bean, mung bean, and lupin bean; seeds such as almond, peanut, cashew nut, pistachio, hazelnut, macadamia nut, linseed, sesame, rapeseed, cottonseed, safflower, and sunflower; potatoes such as potato, sweet potato, yam, artichoke, and cassava; vegetables such as asparagus, artichoke, cauliflower, broccoli, and green soybean; fruits such as banana, jack fruit, kiwi fruit, coconut, avocado, and olive; mushrooms such as mushroom, *Eryngii* mushroom, shiitake mushroom, shimeji mushroom, and maitake mushroom; and algae such as *chlorella, spirulina, euglena*, laver, kelp, seaweed, agar, hijiki, and mozuku. Among them, the origin of the vegetable protein is preferably at least one selected from the group consisting of wheat, soybean, pea, and rice, and is more preferably at least one selected from the group consisting of soybean and wheat, from the viewpoint of obtaining a meat alternative having an appearance and texture similar to those of mass meat.

The vegetable protein may contain one kind of plant-derived protein, or may contain two or more kinds of plant-derived proteins.

The vegetable protein binder according to the disclosure is preferably used for a fiber bundle-shaped textured protein.

The fiber bundle-shaped textured protein is a protein having a certain texture.

The fiber bundle shape refers to a structure similar to a bundle of fibers extending one direction.

The textured protein is preferably a textured protein having a muscle-like texture from the viewpoint of the texture.

The muscle-like texture refers to a texture that has a structure similar to that of a bundle of fibers and can be split in one direction, that is, a direction along a longitudinal direction of the bundle of fibers.

Among them, the muscle-like texture is preferably a texture that has a structure similar to a bundle of fibers and can be split into fibers in one direction.

Lean of livestock meat is derived from muscle. The muscle is composed of a bundle of muscle fibers. Therefore, the lean of the livestock meat has a structure like a bundle of fibers. In a case in which the vegetable protein binder according to the disclosure is applied to a fiber bundle-shaped textured protein having a muscle-like texture, it is possible to obtain a meat alternative having a texture closer to that of livestock meat.

Examples of the fiber bundle-shaped textured protein having a muscle-like texture include a sponge fiber bundle-shaped textured protein and a fibrous fiber bundle-shaped textured protein.

The sponge refers to an isotropic porous structure in appearance.

The fibrous refers to an anisotropic fiber structure in appearance.

An isotropic porous structure refers to a structure in which a hole shape in a cross section obtained by cutting a chunk meat-like meat alternative at an arbitrary position is a substantially elliptical shape and is substantially the same regardless of a cutting direction.

An anisotropic fiber structure refers to a structure in which a cross section obtained by cutting a chunk meat-like meat alternative at an arbitrary position is fibrous. A cross section obtained by cutting the chunk meat-like meat alternative preferably has a hole shape, and the hole shape has a different shape such as a substantially elliptical shape or a substantially fibrous shape in the cutting direction.

Examples of a method of observing the cross section include a method in which a chunk meat-like meat alternative is cut, a section is cut out, and a cross section of the section is observed with a microscope, and a method in which a cross section is observed with X-ray computed tomography (CT).

(Production Method)

A method of producing a vegetable protein binder according to the disclosure is not particularly limited, and examples thereof include a method of mixing a polysaccharide including a thermally irreversible gel-forming polysaccharide and a thermally reversible gel-forming polysaccharide, a gelling agent, and a gelation retardant.

The order of addition of the thermally irreversible gel-forming polysaccharide, the thermally reversible gel-forming polysaccharide, the gelling agent, and the gelation retardant at the time of producing a vegetable protein binder is not particularly limited. It is preferable to mix these materials in advance and simultaneously add the mixture from the viewpoint of retardation of gelation.

<Chunk Meat-Like Meat Alternative>

A chunk meat-like meat alternative according to the disclosure contains a vegetable protein and the vegetable protein binder according to the disclosure.

(Vegetable Protein)

The vegetable protein contained in the chunk meat-like meat alternative according to the disclosure is not particularly limited, and the vegetable protein described above can be applied.

From the viewpoint of the texture, the vegetable protein contained in the chunk meat-like meat alternative according to the disclosure is preferably a textured protein, and more preferably a fibrous fiber bundle-shaped textured protein.

From the viewpoint of the appearance, it is preferable that the vegetable protein is a fiber bundle-shaped textured protein, and a fiber axis direction of the fiber bundle-shaped textured protein is oriented in one direction.

From the viewpoint of the appearance, in the fiber bundle-shaped textured protein contained in the disclosure, it is preferable that the fiber axis direction of the fiber bundle-shaped textured protein is oriented in one direction in an adjacent region.

The fiber axis direction of the fiber bundle-shaped textured protein means an orientation of a longitudinal direction of fibers forming the muscle-like texture.

The aspect in which the fiber axis direction of the fiber bundle-shaped textured protein is oriented in one direction in the adjacent region includes, for example, an aspect in which the fiber axis direction of the fiber bundle-shaped textured protein is different in the adjacent region, an aspect in which the fiber axis direction of the fiber bundle-shaped textured protein is oriented in a constant direction as a whole, and an aspect in which the fiber axis direction of the fiber bundle-shaped textured protein has a fluctuation as a whole but is oriented in one direction in the adjacent region, in addition to an aspect in which the fiber axis direction of the fiber bundle-shaped textured protein is oriented in one direction as a whole.

The sponge textured protein having an isotropic porous structure is also formed into a fiber bundle-shaped textured protein by a method of loosening a protein into a fiber shape or a method of cutting a protein into a fiber shape.

From the viewpoint of the appearance or the texture, the fiber bundle-shaped textured protein contained in the chunk meat-like meat alternative is more preferably a fibrous textured protein.

A content of the vegetable protein is preferably from 5% by mass to 95% by mass, more preferably from 7% by mass to 90% by mass, and still more preferably from 10% by mass to 85% by mass, with respect to an entirety of the chunk meat-like meat alternative.

(Vegetable Protein Binder)

The chunk meat-like meat alternative according to the disclosure contains a vegetable protein binder.

As the vegetable protein binder, the vegetable protein binder according to the disclosure is applied.

A content of the vegetable protein binder is preferably from 1% by mass to 30% by mass, and more preferably from 3% by mass to 20% by mass, with respect to the mass of an entirety of the chunk meat-like meat alternative.

A content of the polysaccharide is preferably 1% by mass or more, more preferably from 3% by mass to 30% by mass, and still more preferably from 5% by mass to 20% by mass, with respect to an entirety of the chunk meat-like meat alternative, from the viewpoint of maintenance of the shape of the chunk meat-like meat alternative after cooking and the texture.

(Oil and/or Fat)

It is preferable that the chunk meat-like meat alternative according to the disclosure contains oil and/or fat from the viewpoint of the texture.

Examples of the oil and/or fat include vegetable oil and/or fat and animal oil and/or fat.

Examples of the vegetable oil and/or fat include rapeseed oil, soybean oil, palm oil, olive oil, rice oil, corn oil, and coconut oil. Note that the vegetable oil and/or fat refers to oil and/or fat obtained from a plant.

Examples of the animal oil and/or fat include beef tallow, lard, whale oil, and fish oil. Note that the animal oil and/or fat refers to oil and/or fat obtained from an animal.

A melting point of the oil and/or fat is not particularly limited, and may be, for example, 300° C. or lower.

The melting point of the oil and/or fat is a value measured by a thermal analysis measurement apparatus.

As the thermal analysis measurement apparatus, for example, SSC5000DSC200 manufactured by Seiko EG&G Co., Ltd. can be used.

The melting point of the oil and/or fat is measured by adding 3 mg of a sample to an apparatus and performing a measurement at a heating rate of 3° C./min.

A content of the oil and/or fat is preferably from 0% by mass to 50% by mass, more preferably from 1% by mass to 40% by mass, and still more preferably from 3% by mass to 30% by mass, with respect to an entirety of the chunk meat-like meat alternative.

(Emulsion)

It is preferable that the chunk meat-like meat alternative according to the disclosure contains an emulsion from the viewpoint of the texture.

Herein, the term "emulsion" refers to an emulsion that contains oil and/or fat and water and is in an emulsified state such as an oil-in-water emulsion or a water-in-oil emulsion.

The emulsion may be an oil-in-water emulsion or may be a water-in-oil emulsion, and from the viewpoint of the texture, the emulsion is preferably a water-in-oil emulsion.

The emulsion may contain water, oil and/or fat, a surfactant, and the like.

The water contained in the emulsion may be any water that can be used for food, and is not particularly limited.

A content of the water in the emulsion is preferably from 10% by mass to 95% by mass, more preferably from 20% by mass to 90% by mass, and still more preferably from 30% by mass to 85% by mass, with respect to an entirety of the emulsion.

Examples of the oil and/or fat include vegetable oil and/or fat and animal oil and/or fat.

Specific examples of the vegetable oil and/or fat and the animal oil and/or fat are the same as those described above.

A content of the oil and/or fat in the emulsion is preferably from 5% by mass to less than 90% by mass, more preferably from 10% by mass to 80% by mass, and still more preferably from 15% by mass to 70% by mass, with respect to an entirety of the emulsion.

Examples of the surfactant contained in the emulsion include an edible surfactant.

Examples of the edible surfactant include glycerin fatty acid ester, polyglycerin fatty acid ester, organic acid monoglyceride, sorbitan fatty acid ester, propylene glycol fatty acid ester, sucrose fatty acid ester, polyglycerin condensed ricinoleic acid ester, and lecithin.

A content of the surfactant in the emulsion is preferably from 0.1% by mass to less than 5% by mass with respect to an entirety of the emulsion.

(Fat Mass Composition)

The chunk meat-like meat alternative according to the disclosure may contain a fat mass composition containing a granular material containing oil and/or fat and a hydrophilic gel.

As the oil and/or fat contained in the fat mass composition, the same oil and/or fat as those described above can be used.

An average particle diameter of the granular material is preferably from 50 μm to 500 μm.

The average particle diameter of the granular material is a value obtained by measuring particle diameters of five granular materials by observing the fat mass composition with a transmission optical microscope and calculating an average value thereof.

It is preferable that the fat mass composition contains a hydrophilic gel, and the hydrophilic gel is gelled with an edible ionically crosslinkable polymer crosslinked with a cation.

The term "edible" means a property that does not adversely affect a health condition when orally ingested by a human.

The term "ionically crosslinkable polymer" means a polymer that is crosslinked by a reaction with an ion.

Examples of the edible ionically crosslinkable polymer include alginic acid, carrageenan, LM pectin, and low acyl (LA) gellan gum.

From the viewpoint of improving the heat resistance of the fat mass composition, the edible ionically crosslinkable polymer is preferably at least one selected from the group consisting of alginic acid, LM pectin, and low acyl (LA) gellan gum.

The cation is preferably a metal ion having an ionic valence of 2 or higher.

Examples of the metal ion include divalent metal ions such as a calcium ion, a magnesium ion, an iron(II) ion, a copper(II) ion, a zinc ion, and a manganese ion, and trivalent metal ions such as an aluminum ion and an iron(III) ion.

From the viewpoint of obtaining a stable crosslinked structure, the metal ion is preferably at least one selected from a calcium ion, a magnesium ion, or a zinc ion, and more preferably a calcium ion.

A content of the fat mass composition is preferably from 0% by mass to 50% by mass, more preferably from 1% by mass to 40% by mass, and still more preferably from 3% by mass to 30% by mass, with respect to an entirety of the chunk meat-like meat alternative.

(Other Additives)

The chunk meat-like meat alternative according to the disclosure may contain, for example, additives such as water, a seasoning, an acidulant, a bittering agent, a spice, a sweetener, an antioxidant, a coloring material, a color coupler, a flavor, a stabilizer, and a preservative.

In a case in which these additives are used, a content of the additives with respect to the chunk meat-like meat alternative is preferably from 0% by mass to 20% by mass.

(Toughness)

The chunk meat-like meat alternative according to the disclosure has a toughness in a multi-byte test of from 1,000 gw cm/cm$^2$ to 50,000 gw cm/cm$^2$.

From the viewpoint of the texture, the toughness in the multi-byte test is preferably from 1,500 gw cm/cm$^2$ to 40,000 gw cm/cm$^2$, and more preferably from 2,000 gw cm/cm$^2$ to 30,000 gw cm/cm$^2$.

The toughness in the multi-byte test is a value measured by a viscoelasticity tester. As the viscoelasticity tester, for example, TENSIPRESSER MyBpy2system (product name) manufactured by Takemoto Denki Co., Ltd. can be used.

Hereinafter, a method of measuring a toughness in a multi-byte test will be specifically described.

In the method of measuring a toughness in a multi-byte test, a multi-byte test is used. A sample is cut into a size of 30 mm square and a thickness of 5 mm. The sample is set on a stage of the viscoelasticity tester, a measurement is performed three times under multi-byte test measurement conditions, and an average value thereof is taken as a measured value.

(Degree of Orientation of Fiber Direction in Cross Section of Chunk Meat-Like Meat Alternative)

A degree of orientation of the fiber direction in a cross section of the chunk meat-like meat alternative according to the disclosure is preferably 1.1 or more.

From the viewpoint of the appearance or cross section and the texture, the degree of orientation of the fiber direction is more preferably from 1.20 to 1.60, still more preferably from 1.25 to 1.50, and particularly preferably from 1.30 to 1.45.

The degree of orientation of the fiber direction in the cross section of the chunk meat-like meat alternative is calculated by the method of the following Literature 1 from an image obtained by imagining the cross section of the chunk meat-like meat alternative.

Literature 1: Enomae, T., Han, Y-H. and Isogai, A., "Non-destructive determination of fiber orientation distribution of paper surface by image analysis", Nordic Pulp and Paper Research Journal 21(2): 253-259(2006).http://www.enomae.com/publish/pdf/2006NPPRJ_FibreOrientation.pdf (Method of Measuring Degree of Orientation of Fiber Direction in Cross Section of Chunk Meat-Like Meat Alternative)

Specifically, the degree of orientation of the fiber direction in the cross section is calculated as follows.

—Cross Section Imaging—

A cross section is exposed by cutting the chunk meat-like meat alternative along a thickness direction, and the cross section of the chunk meat-like meat alternative is imaged under the following conditions.

Imaging Conditions

Digital camera: manufactured by FUJIFILM Corporation, product name GFX100 Lens: GF 63 mm F 2.8 R WR Imaging mode: monochrome
Diaphragm value: F4
Shutter speed: 1/30
ISO sensitivity: 100
Light quantity of meat alternative surface: EV=9 1,280 lux
Background at time of imaging: white —Calculation of Specific Degree of Orientation—

From the cross-sectional image obtained by imagining, a portion corresponding to a region having a square shape having one side of 15 mm is cut out as a unit area in the cross section of the chunk meat-like meat alternative. A degree of orientation is calculated in the unit area based on Literature 1, and an average of values calculated at five points is taken as a specific degree of orientation.

The degree of orientation may be calculated in any manner as long as the degree of orientation can be calculated, and for example, a non-destructive paper surface fiber orientation analysis program FiberOri8single03.exe, which is free software, can be used. As the non-destructive paper surface fiber orientation analysis program, free software described in the following site may be used.

http://www.enomae.com/FiberOri/index.htm

In a case in which a size of the chunk meat-like meat alternative is less than 15 mm, the same chunk meat-like meat alternatives are stacked to a size of 15 mm or more, and imaging and calculation of a specific degree of orientation are performed.

Figure 7:
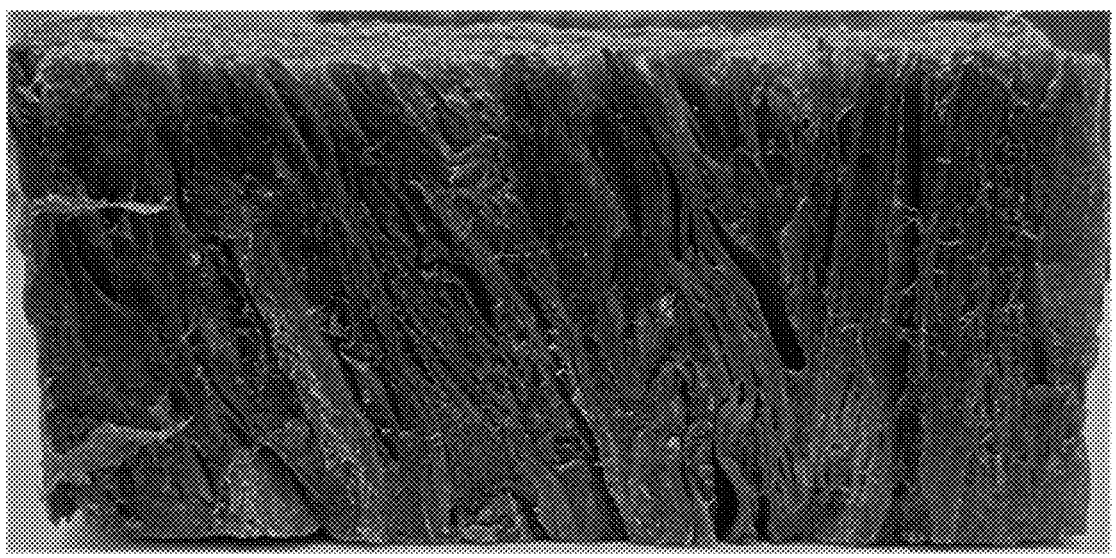
FIG. 7 is a schematic front view showing an example of a cross section of the chunk meat-like meat alternative according to the disclosure.

As an example of the degree of orientation, a schematic front view showing an example of the cross section of the chunk meat-like meat alternative according to the disclosure is illustrated in FIG. 7. FIG. 7 illustrates an example in which a degree of orientation is 1.42.

<Method of Producing Chunk Meat-Like Meat Alternative>

A method of producing a chunk meat-like meat alternative according to the disclosure includes: a first step of mixing a fiber bundle-shaped textured protein and the vegetable protein binder according to the disclosure to obtain a mixture; and a second step of stretching the mixture to obtain a stretched mixture, in which a fiber axis direction of the fiber bundle-shaped textured protein is oriented in one direction.

An embodiment of the method of producing a chunk meat-like meat alternative according to the disclosure will be described below, but the disclosure is not limited thereto.

(Preparation Step)

The method of producing a chunk meat-like meat alternative according to the disclosure may include, before the first step, a step of preparing a fiber bundle-shaped textured protein.

As the fiber bundle-shaped textured protein, the produced fiber bundle-shaped textured protein may be used, or a commercially available fiber bundle-shaped textured protein may be used.

In a case in which the fiber bundle-shaped textured protein is produced, it is preferable to produce a fiber bundle-shaped textured protein by extruding a raw material containing a vegetable protein from an extruder.

Note that extrusion conditions are preferably as follows.

In a case in which the textured protein is produced, it is preferable to produce a textured protein by extruding a raw material containing a vegetable protein from an extruder.

Note that extrusion conditions are preferably as follows.

Raw Material Containing Vegetable Protein

As the raw material containing a vegetable protein, at least a vegetable protein is contained, and it is preferable to contain water from the viewpoint of improving extraction efficiency.

A content of the water is preferably from 2 parts by mass to 30 parts by mass with respect to 10 parts by mass of the protein.

Extrusion Conditions

The extruder is not particularly limited, and a known single screw extruder, non-intermeshing counter-rotating twin screw extruder, intermeshing counter-rotating twin screw extruder, and intermeshing co-counter rotating twin screw extruder can be used.

As for a barrel temperature of the extruder, a temperature of a barrel front half portion (a portion from a raw material supply unit to the center of the barrel) is preferably from 60° C. to 100° C., a temperature of the center of the barrel (an axial length center of the barrel) is preferably from 90° C. to 170° C., and a temperature of a barrel rear half portion (a portion from the center of the barrel to the tip of the barrel) is preferably from 140° C. to 180° C.

It is preferable that the extruder has a die attached to the tip of the barrel.

The die is preferably a die from which a sheet-like extrudate is obtained.

A gap (lip clearance) of a discharge port of the die is preferably from 1 mm to 10 mm.

A length of the die is preferably 30 mm or more.

The die may be a cooling die. The cooling die refers to, for example, a die cooled by circulation of a cooling liquid (water, glycol, or the like).

Swelling of the extruded raw material is easily suppressed by using the cooling die. Therefore, the textured protein extruded using the cooling die tends to be fibrous.

In a case in which the cooling die is used, a temperature of the discharge port of the cooling die is preferably from 90° C. to 120° C.

In a case in which a commercially available textured protein is used, as the fiber bundle-shaped textured protein, "What the cluck" manufactured by The Vegetarian Butcher Japan Inc., "APEX 1000" manufactured by FUJI OIL CO., LTD., and the like can be used.

(First Step)

The first step is a step of mixing a fiber bundle-shaped textured protein and the vegetable protein binder according to the disclosure to obtain a mixture.

The fiber bundle-shaped textured protein has the same meaning as the fiber bundle-shaped textured protein contained in the chunk meat-like meat alternative, and a preferred aspect thereof is also the same as the fiber bundle-shaped textured protein contained in the chunk meat-like meat alternative.

The amount of the vegetable protein binder added in the first step is preferably from 1% by mass to 30% by mass, more preferably from 3% by mass to 25% by mass, and still more preferably from 5% by mass to 20% by mass, with respect to the mass of the fiber bundle-shaped textured protein swollen by moisture.

A method of mixing the fiber bundle-shaped textured protein and the vegetable protein binder is not particularly limited, and examples thereof include a method of mixing by hand and a method using a known mixing device.

Examples of the mixing device include a mixer, and attachment of the mixer preferably has a structure that scrapes up deposits on a wall surface.

It is preferable to adjust the fiber bundle-shaped textured protein to an appropriate size before mixing the fiber bundle-shaped textured protein and the vegetable protein binder.

Examples of a method of adjusting a size of the fiber bundle-shaped textured protein include a method of tearing the fiber bundle-shaped textured protein, a method of cutting the fiber bundle-shaped textured protein with a knife, and a method using both methods.

The size of the fiber bundle-shaped textured protein may be adjusted by crushing the protein in the vicinity of the discharge port of the extruder in the above-described (Preparation Step), or may be adjusted by crushing the protein using a meat mallet or the like after collection from the extruder.

It is preferable that the fiber bundle-shaped textured protein has a horizontal width of from 2 mm to 35 mm and a vertical width of from 35 mm to 500 mm before being mixed with the vegetable protein binder.

A thickness of the fiber bundle-shaped textured protein is not particularly limited, and is preferably appropriately adjusted according to a thickness of the fiber bundle-shaped textured protein produced by an extruder or the like. The horizontal width of the fiber bundle-shaped textured protein is preferably, for example, from 0.1 times to 2 times the horizontal width of the chunk meat-like meat alternative to be produced.

In a case in which the chunk meat-like meat alternative to be produced contains oil and/or fat, a fat mass composition, other additives, and the like, it is preferable to mix these materials together with the fiber bundle-shaped textured protein and the binder in the first step.

(Second Step)

The second step is a step of stretching the mixture to obtain a stretched mixture, in which a fiber axis direction of the fiber bundle-shaped textured protein is oriented in one direction.

A method of stretching the mixture obtained in the first step (hereinafter, also referred to as "first step mixture") is not particularly limited as long as a stretched mixture in which a fiber axis direction of the fiber bundle-shaped textured protein is oriented in one direction is obtained.

The fiber axis direction of the fiber bundle-shaped textured protein means an orientation of a longitudinal direction of fibers forming a muscle-like texture.

The case in which "the fiber axis direction of the fiber bundle-shaped textured protein is oriented in one direction" includes a case in which the fiber axis directions of the fiber bundle-shaped textured proteins are completely the same and a case in which the fiber axis directions of the fiber bundle-shaped textured proteins are different but are oriented in a certain direction.

The second step is preferably a step of stretching the mixture obtained in the first step to obtain a stretched mixture in which a degree of orientation (hereinafter, also simply referred to as "specific degree of orientation) of the fiber direction of the fiber bundle-shaped textured protein in a cross section along a stretching direction is 1.1 or more.

From the viewpoint of the appearance or cross section and the texture, the specific degree of orientation is preferably 1.10 or more, more preferably 1.15 or more, and still more preferably 1.20 or more.

The specific degree of orientation is a value calculated by the method described in Literature 1.

Specifically, the specific degree of orientation is calculated by the method described in Literature 1 from an image obtained by imaging a cross section of the stretched mixture in the stretching direction.

—Method of Measuring Specific Degree of Orientation—

Specifically, the specific degree of orientation is calculated by the following procedure of (Cross Section Imaging) and (Calculation of Specific Degree of Orientation).

(Cross Section Imaging)

The stretched mixture after the second step is heated and cured. Thereafter, a cross section is exposed by cutting the stretched mixture along the stretching direction, and the cross section of the stretched mixture is imaged under the following conditions.

Imaging Conditions

Digital camera: manufactured by FUJIFILM Corporation, product name GFX100

Lens: GF 63 mm F 2.8 R WR

Imaging mode: monochrome

Diaphragm value: F4

Shutter speed: 1/30

ISO sensitivity: 100

Light quantity of meat alternative surface: EV=9 1,280 lux

Background at time of imaging: white (Calculation of Specific Degree of Orientation)

From the cross-sectional image obtained by imagining, a portion corresponding to a region having a square shape having one side of 15 mm is cut out as a unit area in the cross section of the stretched mixture. A degree of orientation is calculated in the unit area based on Literature 1, and an average of values calculated at five points is taken as a specific degree of orientation.

The degree of orientation may be calculated in any manner as long as the degree of orientation can be calculated, and for example, a non-destructive paper surface fiber orientation analysis program FiberOri8single03.exe, which is free software, can be used. As the non-destructive paper surface fiber orientation analysis program, free software described in the following site may be used.

http://www.enomae.com/FiberOri/index.htm

In a case in which a size of the stretched mixture is less than 15 mm, the same stretched mixtures are stacked to a size of 15 mm or more, and imaging and calculation of a specific degree of orientation are performed.

From the viewpoint of the degree of orientation, the method of stretching the first step mixture is preferably any one of:

(i) a method of stretching the mixture in a direction perpendicular to a plane including a rotation axis of a set of rollers by passing the mixture through a region surrounded by the set of rollers in the direction perpendicular to the plane including the rotation axis of the set of rollers and pressing the mixture by the rollers;

(ii) a method of stretching the mixture in a direction parallel to a rotation axis of a set of rollers by sandwiching the mixture between the set of rollers having parallel rotation axes and rotating in the same direction and pressing the mixture by reducing a distance between the rollers while rotating the mixture;

(iii) a method of stretching the first step mixture by gripping and pulling a surface of the first step mixture; and (iv) a method of stretching the first step mixture by pressing the first step mixture with a plate.

A stretch ratio of the mixture is preferably 2 times or more, more preferably 4 times or more, and still more preferably 6 times or more.

The stretch ratio is a value obtained by dividing the length of the stretched mixture in the stretching direction by the length of the first step mixture in the stretching direction.

Note that the stretching direction refers to a direction in which the first step mixture is stretched in the second step.

—(i)—

Details of the method of stretching the mixture in a direction perpendicular to a plane including a rotation axis of a set of rollers (hereinafter, referred to as "roller set") by passing the mixture through a region surrounded by the set of rollers in the direction perpendicular to the plane including the rotation axis of the set of rollers and pressing the mixture by the rollers will be described.

The term "perpendicular" includes a range that can be considered to be substantially a right angle (specifically, a range of 90°±10°).

Examples of a method of passing the mixture through the region surrounded by the set of rollers in the direction perpendicular to the plane including the rotation axis of the set of rollers include a method of passing the first step mixture through a region surrounded by a set of rollers by moving one of the set of rollers or the first step mixture.

From the viewpoint of simplifying a production continuity process, it is preferable to move the first step mixture.

The method of moving the first step mixture is not particularly limited, and the first step mixture may be moved by wrapping the first step mixture with a film and pulling the film as a carrier.

An example of an arrangement mode of the roller set is as illustrated in FIG. 1.

FIG. 1 is a view showing a series of flows in which a first step mixture 1 is passed through a region surrounded by a set of rollers (roller set) 2 and the first step mixture 1 is stretched to obtain a stretched mixture 4.

The first step mixture 1 is passed through the region surrounded by the set of rollers 2 along a direction (that is, the direction of the thick arrow in FIG. 1) perpendicular to a plane including a rotation axis of the rollers included in the set of rollers 2.

As a result, the first step mixture 1 is stretched in the direction perpendicular to the plane including the rotation axis of the set of rollers by pressing the first step mixture 1 by the rollers.

Hereinafter, the rollers included in the set of rollers 2 will be described.

A size of the roller is not particularly limited, and is appropriately adjusted according to the size of the chunk meat-like meat alternative to be produced.

A length of the roller in an axial direction is preferably, for example, from 10 mm to 200 mm.

A diameter of the roller (a diameter of a cross section of the roller in a plane orthogonal to the axial direction of the roller) is preferably, for example, from 10 mm to 100 mm.

The rollers included in the set of rollers may have the same size or different sizes.

In the roller set, two rollers may be arranged so that the rotation axes of the rollers are parallel, or three or more rollers may be arranged so that the rotation axes of the rollers form a polygonal side.

In the case of two rollers, a distance between the rollers (obtained by subtracting a radius of the two rollers from the distance between shafts of the rollers) is, for example, preferably from 5 mm to 200 mm, more preferably from 10 mm to 150 mm, and still more preferably from 20 mm to 100 mm.

In the case of three or more rollers, an area of the region surrounded by the rollers (that is, the region surrounded by the rollers on the surface including the rotation axes of the rollers) is, for example, preferably from 25 mm$^2$ and 90,000 mm$^2$, more preferably from 100 mm$^2$ and 62,500 mm$^2$, and still more preferably from 400 mm$^2$ and 40,000 mm$^2$.

The roller may rotate itself in a circumferential direction of the roller, or the roller may rotate in the circumferential direction by a stress generated by passing the first step mixture between the rollers.

As for the rotation direction of the roller, it is preferable that a portion of the roller that comes into contact with the first step mixture rotates in a direction along a moving direction of the first step mixture.

In a case in which the roller rotates itself in the circumferential direction, the number of rotations of the roller is not particularly limited, and is, for example, from 10 rpm to 100 rpm. Note that rpm is an abbreviation for revolutions per minute.

From the viewpoint of production continuity and the viewpoint of the degree of orientation, the second step is preferably a step of stretching the first step mixture by passing the first step mixture through a set of plural rollers arranged in one direction.

Figure 2:
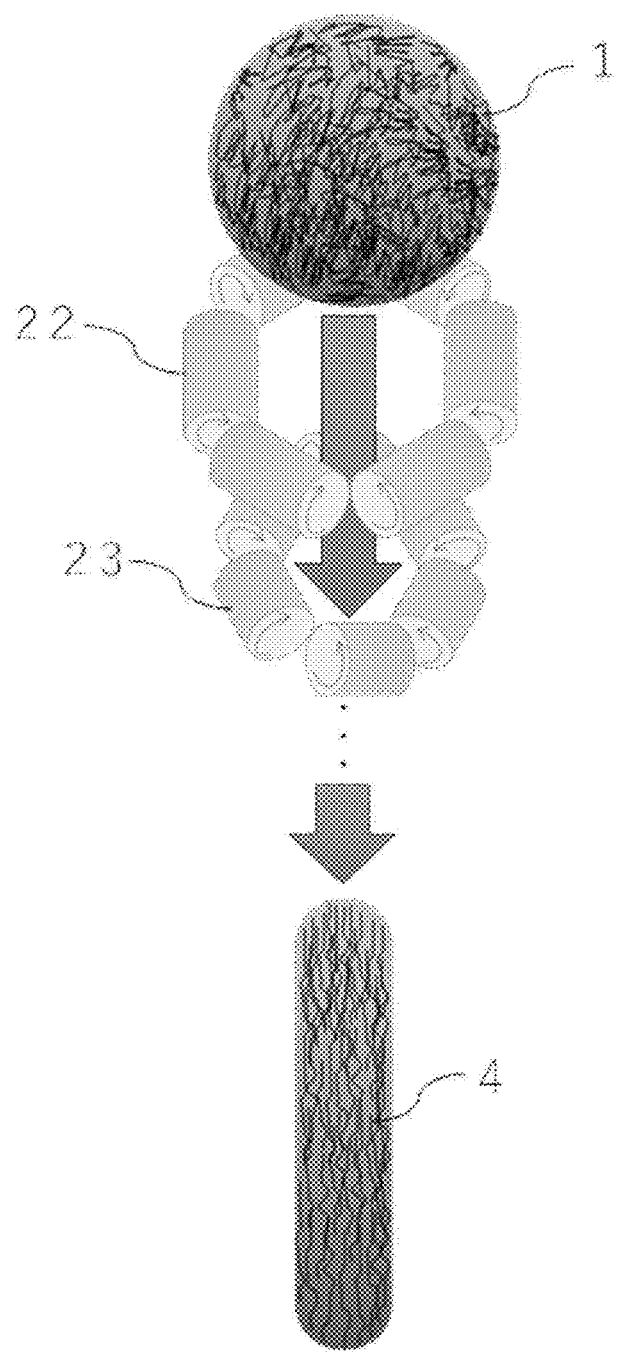
FIG. 2 is a schematic perspective view showing another example of the arrangement mode of the set of rollers.

An example of a multi-stage arrangement mode of the set of plural rollers is as illustrated in FIG. 2.

FIG. 2 is a view showing a series of flows in which a first step mixture 1 is stretched by passing the first step mixture 1 between a first roller set 22 and a second roller set 23 to obtain a stretched mixture 4.

In FIG. 2, the first roller set 22 and the second roller set 23 are arranged along a direction in which the first step mixture 1 is moved.

It is preferable that the first roller set 22 and the second roller set 23 are arranged to have a crossing angle with each other in a direction in which the first step mixture 1 is moved as an axis and rotate about the axis.

The number of roller sets may be two or more, and is preferably adjusted according to the size of the first step mixture and the size of the chunk meat-like meat alternative to be produced.

The number of roller sets is preferably from 2 to 6, more preferably from 2 to 5, and still more preferably from 2 to 4.

A distance between the roller sets is, for example, preferably from 10 mm to 200 mm, more preferably from 20 mm to 150 mm, and still more preferably from 30 mm to 100 mm.

The distance between the roller sets refers to a perpendicular distance between a surface including rotation axes of the rollers included in the one roller set and a surface including rotation axes of the rollers included in the other roller set.

A crossing angle between the roller sets is preferably appropriately adjusted according to the number of roller sets.

For example, in the case of two roller sets, a crossing angle is preferably from 80 degrees to 90 degrees, more preferably from 85 degrees to 90 degrees, and still more preferably 90 degrees.

In the case of three or more roller sets, a crossing angle between adjacent roller sets may be the same as or different from each other.

The crossing angle between the adjacent roller sets is preferably from 10 degrees to 90 degrees, more preferably from 15 degrees to 80 degrees, and still more preferably from 20 degrees to 70 degrees.

The crossing angle between the roller sets means a smaller one of crossing angles formed by a shaft of one of the rollers included in one set roller and a shaft of one of the rollers included in the other roller set.

—(ii)—

Next, the method of stretching the mixture in a direction parallel to a rotation axis of a set of rollers by sandwiching the mixture between the set of rollers having parallel rotation axes and rotating in the same direction and pressing the mixture by reducing a distance between the rollers while rotating the mixture will be described.

A size of the roller is not particularly limited, and is appropriately adjusted according to the size of the chunk meat-like meat alternative to be produced.

A length of the roller in an axial direction is preferably, for example, from 10 mm to 2,000 mm.

A diameter of the roller (a diameter of a cross section of the roller in a plane orthogonal to the axial direction of the roller) is preferably, for example, from 10 mm to 1,000 mm.

The rollers are preferably arranged so that axes of the rollers are parallel.

A radius of the circle circumscribing all the rollers included in the set of rollers (a radius of the first step mixture sandwiched between the rollers) may be constant or may vary during the second step.

Hereinafter, the radius of the circle circumscribing all the rollers included in the set of rollers is also simply referred to as "specific radius".

In order to stretch the first step mixture, it is preferable to move one or both rollers included in the set of rollers and to change the specific radius during the second step.

In the case of changing the specific radius, a specific radius at the start of the second step is, for example, preferably from 1 mm to 200 mm, more preferably from 2 mm to 150 mm, and still more preferably from 5 mm to 100 mm.

In the case of changing the specific radius, a specific radius at the end of the second step is, for example, preferably from 1 mm to 100 mm, more preferably from 2 mm to 75 mm, and still more preferably from 5 mm to 50 mm.

The number of rotations of the roller is not particularly limited, and is, for example, from 10 rpm to 100 rpm.

From the viewpoint of stably rotating the mixture, the rotation directions of the sets of rollers are preferably the same direction.

The mode of (ii) will be specifically described with reference to FIG. 3.

Figure 3:
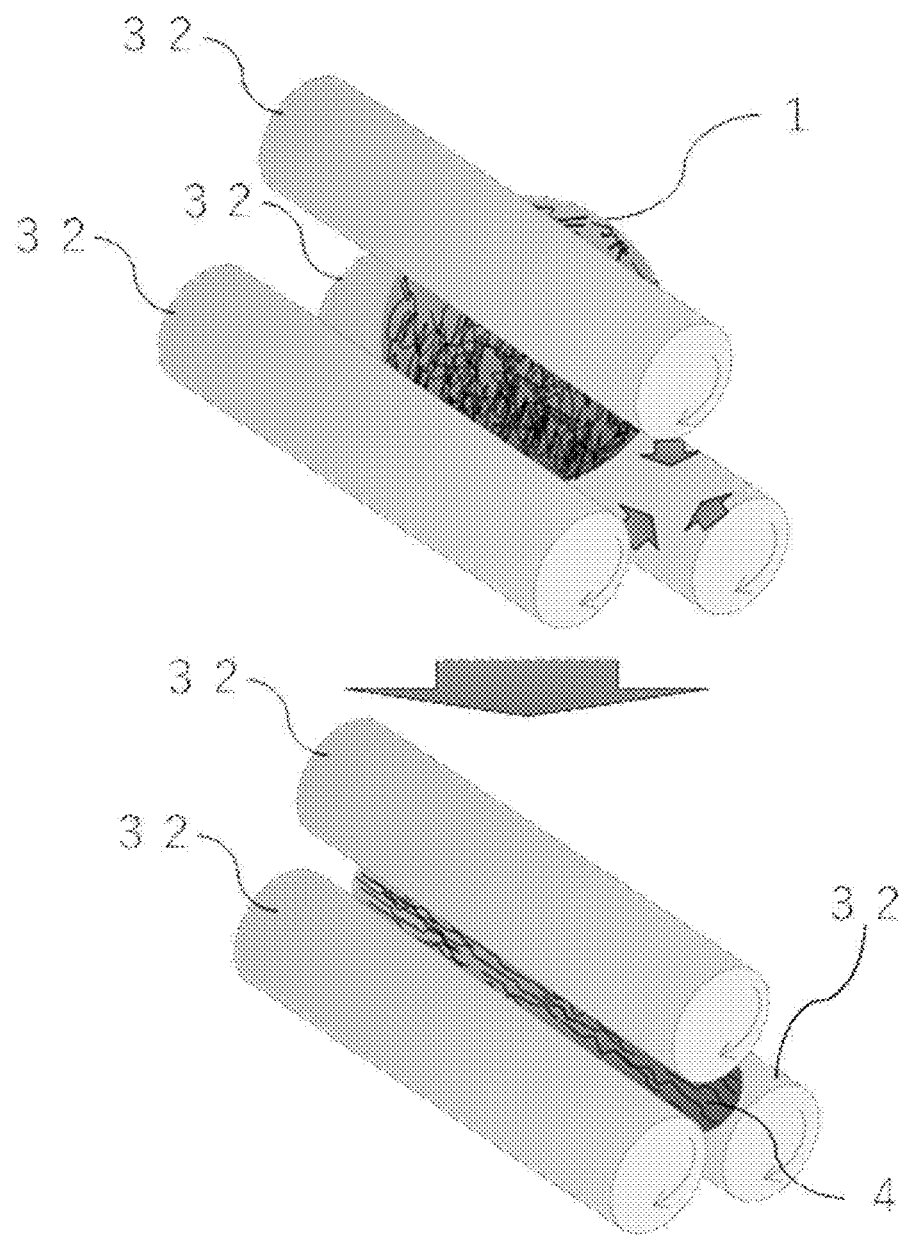
FIG. 3 is a schematic perspective view showing another example of the arrangement mode of the set of rollers.

Note that FIG. 3 is an example of the mode of (ii), and the disclosure is not limited thereto.

FIG. 3 is a view showing a series of flows in which a first step mixture 1 is stretched by rotating the first step mixture 1 on a surface of a set of rollers 32 that rotate to obtain a stretched mixture 4.

In (ii), the roller may have an uneven shape on the surface of the roller.

In (ii), in order to promote stretching of the first step mixture, it is preferable that the surface of the roller has a spiral uneven shape that moves from the center of the roller in a rotation axis direction to both ends of the roller in the rotation axis direction when the rollers rotate. The mode thereof is illustrated in FIG. 4.

Figure 4:
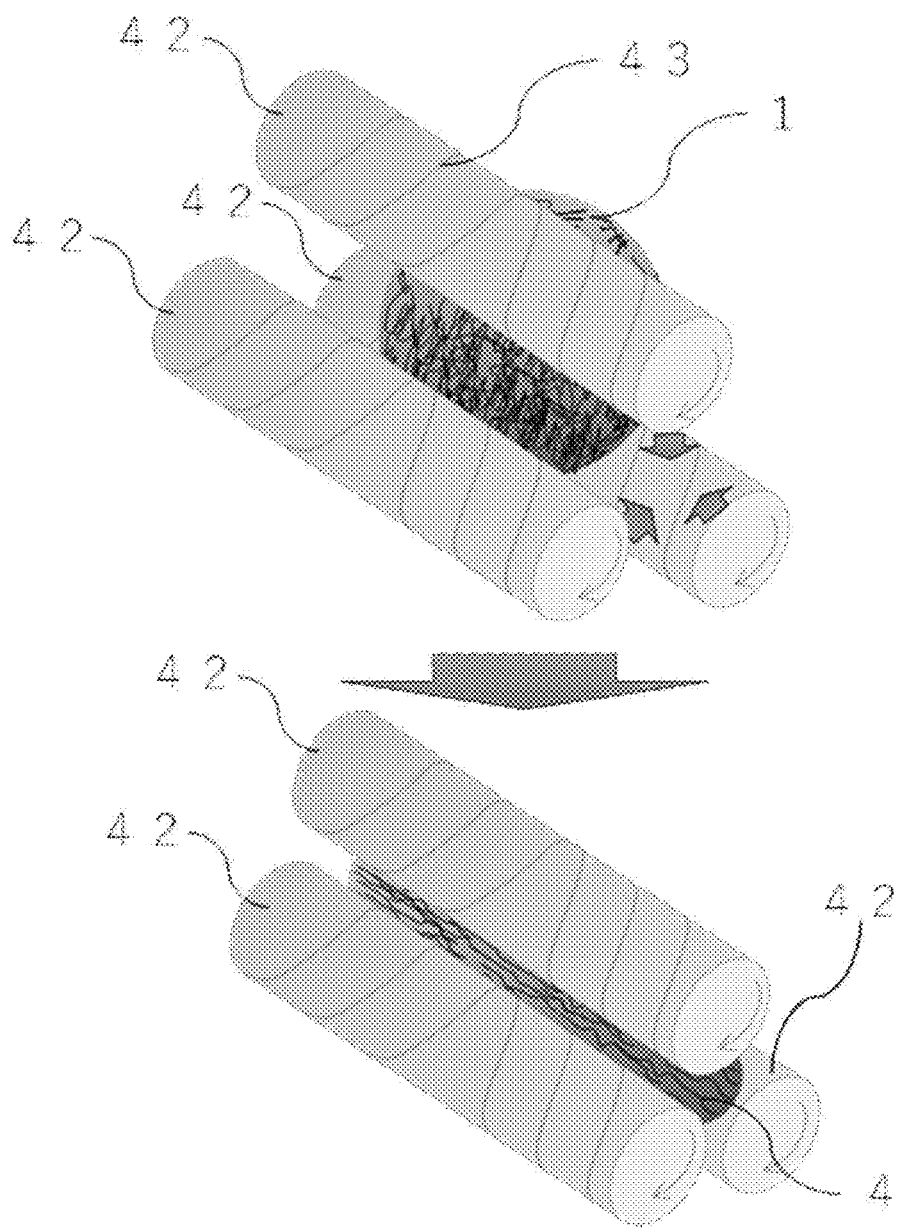
FIG. 4 is a schematic perspective view showing another example of the arrangement mode of the set of rollers.

FIG. 4 is a view showing a series of flows in which a first step mixture 1 is stretched by rotating the first step mixture 1 on a surface of a set of rollers 42 that rotate to obtain a stretched mixture 4.

The surface of each of the rollers included in the set of rollers 42 has a spiral uneven shape 43 that moves from the center of a rotation axis direction of the roller to both ends of the roller in the rotation axis direction when the rollers rotate.

The spiral uneven shape 43 is preferably an uneven shape extending spirally from the center in the rotation axis direction of the roller as a starting point to both ends in the rotation axis direction of the roller.

—(iii)—

Subsequently, details of the method of stretching the first step mixture by gripping and pulling a surface of the first step mixture will be described.

The method of gripping and pulling the surface of the first step mixture is not particularly limited.

Examples of the method of gripping and pulling the surface of the first step mixture include a method of gripping and pulling the surface of the first step mixture by hand.

In a case in which the surface of the first step mixture is gripped and pulled by hand, for example, it is preferable that the surface of the first step mixture is gripped by the right hand and the left hand and the surface of the first step mixture is pulled so that the shape of the first step mixture becomes a rod-like shape.

—(iv)—

Subsequently, details of the method of stretching the first step mixture by pressing the first step mixture with a plate will be described.

The method (iv) is not particularly limited.

As the method (iv), for example, a method of stretching the first step mixture along the shape of a mold by putting the first step mixture into the mold and pressing the first step mixture with a plate, or a method of stretching the first step mixture by sandwiching the first step mixture between two plates and pressing the first step mixture while rotating the first step mixture by moving the plates may be used.

The shape of the mold is not particularly limited, and from the viewpoint of the degree of orientation, it is preferable to form a shape in which a stretch ratio of the stretched mixture obtained after pressing with a plate is high.

The details of the methods (i) to (iv) of stretching the first step mixture are as described above.

The second step preferably include an operation of stretching the first step mixture, cutting the stretched mixture, stacking the cut stretched mixtures with aligned longitudinal directions of the stretched mixtures, and stretching the mixtures again.

When a series of operations of stretching the first step mixture, cutting the stretched mixture, stacking the cut stretched mixtures with aligned longitudinal directions of the stretched mixtures, and stretching the mixtures again is defined as one cycle, from the viewpoint of the degree of orientation and productivity, the number of cycles is preferably from 1 to 5, and more preferably from 2 to 4.

The method of cutting the stretched mixture is not particularly limited, and examples thereof include a method of cutting the stretched mixture by hand and a method of cutting the stretched mixture using a cutter or the like.

When the cut stretched mixtures are stacked with aligned longitudinal directions of the stretched mixtures and the mixtures are stretched again, the stretching methods may be the same or different in each cycle.

In a case in which the chunk meat-like meat alternative to be produced contains oil and/or fat, a fat mass composition, other additives, and the like, these materials may be mixed when the stretched mixtures are stacked between cycles.

(Third Step)

The method of producing a chunk meat-like meat alternative according to the disclosure preferably further includes, after the second step, a third step of molding the stretched mixture to obtain a molded product, and then heating and curing the molded product.

In a case in which the binder contains a thermally irreversible gel-forming polysaccharide, formation of a gel containing a thermally irreversible gel-forming polysaccharide is promoted by heating the molded product. As a result, the molded product is cured, and the shape of the chunk meat-like meat alternative is more easily maintained.

The shape of the molded product is preferably a shape similar to, for example, steak meat or meat for stewing.

A method of molding the stretched mixture is not particularly limited, examples thereof include a method of cutting the stretched mixture and a method of deforming the stretched mixture by applying an external force, and from the viewpoint of the texture, a method of cutting the stretched mixture is preferable.

In a case in which the stretched mixture is cut, it is preferable to cut the stretched mixture in a direction orthogonal to the fiber axis direction of the textured protein contained in the stretched mixture.

In a case in which the stretched mixture is cut, it is preferable to cut the stretched mixture using a knife such as a cutter or a kitchen knife.

When the molded product is obtained by molding the stretched mixture, the third step preferably includes a step of cutting the stretched mixture perpendicularly to an orientation direction of fibers, and a step of bundling a plurality of stretched mixtures before cutting or after cutting.

When a plurality of cut stretched mixtures are bundled and molded, the plurality of cut stretched mixtures may be bundled and molded with aligned fiber directions, or the plurality of stretched mixtures or cut stretched mixtures may be bundled with aligned fiber directions, and then the bundled stretched mixtures or cut stretched mixtures may be cut and molded perpendicularly to the fiber direction.

A chunk meat-like meat alternative having an appearance similar to that of steak of livestock meat is easily obtained by molding the stretched mixture so that the fiber direction is in a thickness direction of the steak.

The third step may include a step of molding the stretched mixture to obtain a molded product, and then forming a pattern similar to fat, for example, a marbled pattern on a surface of the molded product for the purpose of brining an appearance of a chunk meat-like meat alternative closer to an appearance of livestock meat (hereinafter, also referred to as "fat-like portion forming step").

The fat-like portion forming step is preferably, for example, a step of forming a groove having a depth of 100 µm or more in the surface of the molded product and forming a fat-like portion by attaching oil and/or fat to the formed groove.

Examples of a method of forming a groove in the surface of the molded product include a method of digging a surface with a knife and a method of forming a groove with a mold, and the method of forming a groove with a mold is preferable.

Figure 5:
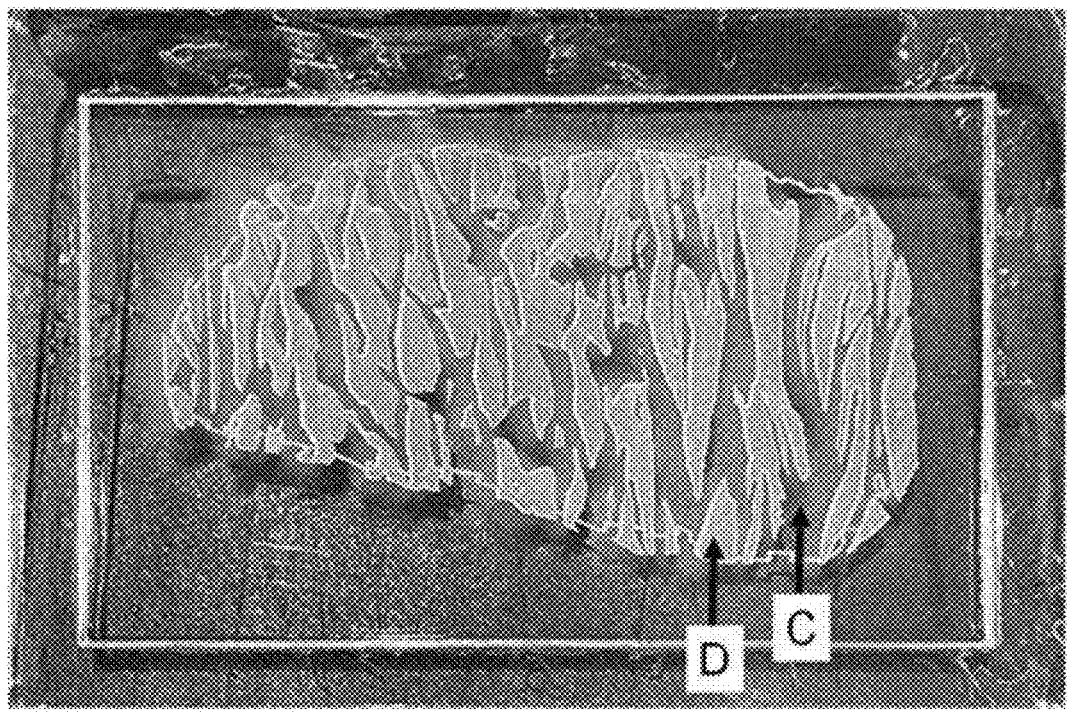
FIG. 5 is a schematic front view showing an example of a mold.

In a case in which the method of forming a groove with a mold is adopted as the method of forming a groove in the surface of the molded product, for example, a mold illustrated in FIG. 5 can be used as the mold.

The mold illustrated in FIG. 5 is a mold having a protrusion provided so as to obtain a groove having a shape close to a shape of fat of mass meat. The region of C in FIG. 5 is a protruding portion, and a groove is formed when the molded product comes into contact with C.

The region of D in FIG. 5 (the whitish region in FIG. 5) is a portion having no protrusion.

It is possible to form a groove in the surface of the molded product by pressing the mold against the surface of the molded product.

Subsequently, oil and/or fat is attached to the groove formed in the surface of the molded product, and the groove is filled to form a pattern similar to that of fat.

When oil and/or fat is attached to the groove formed in the surface of the molded product, the oil and/or fat may be in a liquid state, a semi-solid state in which a liquid and a solid are mixed, or a solid state, and the liquid state or the semi-solid state is preferable.

When oil and/or fat is attached to the groove formed in the surface of the molded product, the oil and/or fat may be attached in an emulsion state.

In a case in which the oil and/or fat is attached in an emulsion state, an emulsion containing a gelling agent, oil and/or fat, and water may be used. The emulsion containing a gelling agent, oil and/or fat, and water is hereinafter referred to as a gelling emulsifier.

It is preferable that the gelling emulsifier is attached to the groove formed in the surface of the molded product, and then the gelling emulsion attached to the groove is gelled.

The gelling emulsifier is preferably an oil-in-water emulsion.

An oil drop diameter of the oil and/or fat in the gelling emulsifier is preferably from 20 µm to 500 µm, more preferably from 30 µm to 400 µm, and still more preferably from 50 µm to 300 µm.

Examples of a method of gelling the gelling emulsifier attached to the groove include a method of gelling the molded product in which the gelling emulsifier is attached to the groove by charging the molded product into an aqueous solution containing a gelling accelerator.

Examples of the fat-like portion forming step include a step of printing on the surface of the molded product with a white ink using a food printer and a step of cutting a white film into a marbled shape and attaching the film to the surface of the molded product.

A method of heating the molded product is not particularly limited, and examples thereof include wet heating (a heating method using water as a heat resource), dry heating (a heating method using a material other than water such as metal or gas as a heat resource), and dielectric heating.

In the case of producing a raw meat-like appearance, from the viewpoint of heat resistance of a colorant, it is preferable that the molded product is uniformly and quickly heated by a wet heating method after vacuum pouch of the molded product.

Examples of the wet heating include a steaming method and a method of boiling water, and the wet heating is preferably a method of boiling water because the molded product can be uniformly and quickly treated.

As for a heating temperature of the molded product, for example, the temperature inside the molded product is preferably from 70° C. to 100° C.

The temperature inside the molded product is a value measured by a thermometer.

As the thermometer, for example, a data logger (TR-W550) manufactured by KEYENCE CORPORATION can be used. The internal temperature of the molded product can be measured by inserting a thermocouple into the chunk meat-like meat alternative during the vacuum pouch.

EXAMPLES

Examples will be described below, but the present invention is not limited to these Examples at all. Note that, in the following description, unless otherwise specified, "part" and "%" are all on a mass basis.

Example 1-1: Preparation of Vegetable Protein Binder 1

A vegetable protein binder 1 was prepared by mixing 15 g of carrageenan (GENUTINE 310-C, manufactured by Sansho Co., Ltd.) as a thermally reversible gel-forming polysaccharide, and 15 g of ALGINIC ACID 429S (manufactured by KIMICA Corporation) containing 9.45 g of sodium alginate as a thermally irreversible gel-forming polysaccharide, 4.2 g of calcium sulfate as a gelling agent (that is, a salt containing a cation, the same applies hereinafter) and 1.35 g of sodium pyrophosphate as a gelation retardant.

Example 1-2: Preparation of Vegetable Protein Binder 2

A vegetable protein binder 2 was prepared by mixing 15 g of carrageenan (GENUTINE 310-C, manufactured by Sansho Co., Ltd.) as a thermally reversible gel-forming polysaccharide, 9.45 g of LM pectin as a thermally irreversible gel-forming polysaccharide, 4.2 g of calcium sulfate as a gelling agent, and 1.35 g of sodium pyrophosphate as a gelation retardant.

Comparative Example 1-1: Preparation of Vegetable Protein Binder C1

Carrageenan (GENUTINE 310-C, manufactured by Sansho Co., Ltd.) as a thermally reversible gel-forming polysaccharide was used as a vegetable protein binder C1.

Comparative Example 1-2: Preparation of Vegetable Protein Binder C2

ALGINIC ACID 429S (manufactured by KIMICA Corporation) containing sodium alginate as a thermally irreversible gel-forming polysaccharide, calcium sulfate as a gelling agent, and sodium pyrophosphate as a gelation retardant was used as a vegetable protein binder C2.

Comparative Example 1-3: Preparation of Vegetable Protein Binder C3

A vegetable protein binder C3 was prepared by mixing 20.8 g of sodium alginate as a thermally irreversible gel-forming polysaccharide and 9.2 g of calcium sulfate as a gelling agent.

<Preparation of Fiber Bundle-Shaped Textured Protein 1>

Defatted soybean powder (SHOWA FRESH RF, manufactured by Showa Sangyo Co., Ltd.) as a vegetable protein and a wheat gluten (PRO-GLU 65, manufactured by THE TORIGOE CO., LTD.) as a vegetable protein were mixed at a ratio of 7:3 (=defatted soybean powder:wheat gluten [mass ratio]) to obtain a mixed powder 1.

A cooling die (die width: 50 mm, lip clearance: 3 mm) having a length of 350 mm was attached to a discharge portion of a twin screw extruder set so that a screw length was 1,100 mm and a maximum temperature of a screw tip portion was 155° C., and an outlet temperature of the cooling die was stabilized at 105° C. The mixed powder 1 was introduced into an extruder at 250 g/min, and 50% by mass of water with respect to the mass of the mixed powder 1 was added to the extruder and discharged from the extruder, thereby obtaining a fiber bundle-shaped textured protein 1 having a fiber axis direction in the same direction as the extrusion direction.

Example 2-1: Production of Chunk Meat-Like Meat Alternative 1

(First Step)

The fiber bundle-shaped textured protein 1 was boiled in 3 L (liter) of boiling water for 10 minutes and subjected to drain.

The fiber bundle-shaped textured protein 1 after being drained was cut to a length of 100 mm and torn along a fiber axis direction so as to have a width of about 5 mm. An aqueous solution containing SAN GRILL BEEF TASTE 3457E (a seasoning not using an animal material, manufactured by San-Ei Gen F.F.I.) as a seasoning (concentration; 5% by mass of the seasoning with respect to an entirety of the aqueous solution) was boiled for 10 minutes, and the boiled aqueous solution was immersed in an aqueous solution containing SAN BEET CONC No. 4948 (a colorant, manufactured by San-Ei Gen F.F.I.) as a colorant (concentration; 3% by mass of the colorant with respect to an entirety of the aqueous solution), thereby obtaining a strip-shaped fiber bundle-shaped textured protein.

Thereafter, 30 g of the vegetable protein binder 1 as a vegetable protein binder and 60 g of water were added to 300 g of the strip-shaped fiber bundle-shaped textured protein, and uniform mixing was performed, thereby obtaining a first step mixture.
(Second Step)

After the first step mixture was formed into a spherical shape, a surface of the mixture was gripped and pulled by hand to obtain a rod-like stretched mixture. Thereafter, the stretched mixture was cut at an intermediate position in a longitudinal direction of the stretched mixture, and the cut stretched mixtures were stacked with aligned longitudinal directions of the cut stretched mixtures, and surfaces of the stacked stretched mixtures were gripped and pulled by hand in the longitudinal direction. The procedure in the second step was defined as one cycle, and the same operation was performed for a total of three cycles, thereby obtaining a stretched mixture.
(Third Step)

The stretched mixture was cut in a direction orthogonal to a fiber axis direction of the textured protein contained in the stretched mixture so as to have a shape of a fillet steak, thereby obtaining a molded product. The molded product was vacuum-pouched and then heated for 1 minute so that the temperature inside the molded product was 75° C. Thereafter, the molded product was rapidly cooled with ice water to obtain a chunk meat-like meat alternative 1.

Example 2-2: Production of Chunk Meat-Like Meat Alternative 2

A chunk meat-like meat alternative 2 was obtained by the same procedure as that of Example 2-1, except that the vegetable protein binder was changed from the vegetable protein binder 1 to the vegetable protein binder 2 in the first step.

Example 2-3: Production of Chunk Meat-Like Meat Alternative 3

Figure 8:
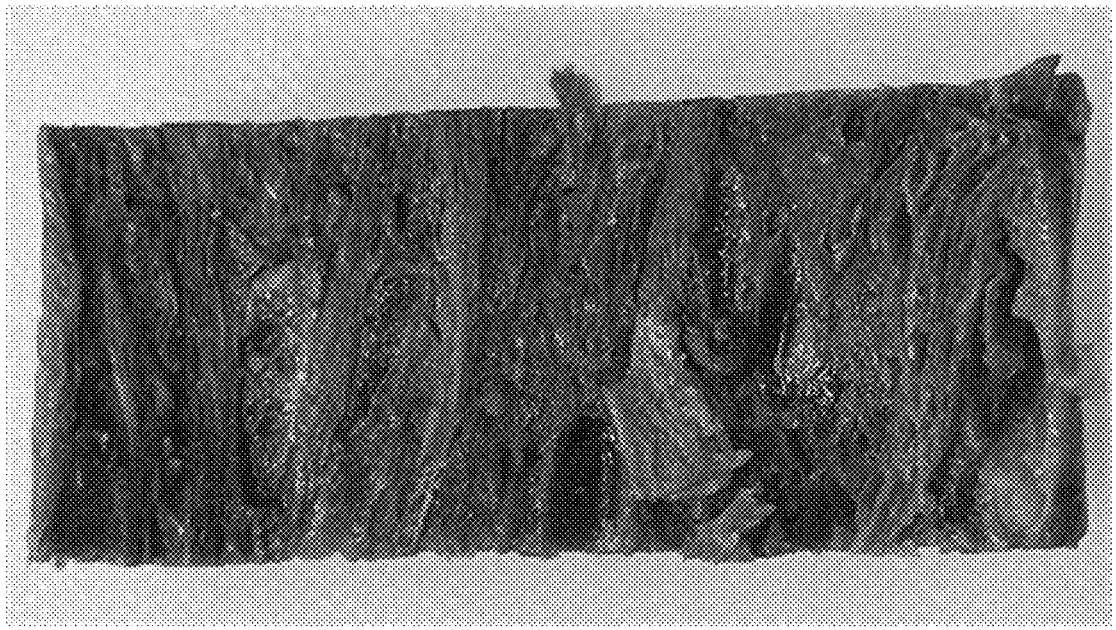
FIG. 8 is a schematic front view showing another example of the cross section of the chunk meat-like meat alternative according to the disclosure.

A fatty chunk meat-like meat alternative (chunk meat-like meat alternative 3) was obtained by the same procedure as that of Example 2-1, except that 30 g of a fat mass composition prepared by the following procedure was mixed with the strip-shaped fiber bundle-shaped textured protein, the vegetable protein binder, and water to obtain a first step mixture in the first step. FIG. 8 illustrates a schematic front view showing a cross section of the obtained fatty chunk meat-like meat alternative.
(Preparation of Fat Mass Composition)
(1) Droplet Forming Step An aqueous phase and an oil phase were prepared as follows.

Aqueous phase: 99.5 parts by mass of tap water and 0.5 parts by mass of RYOTO SUGAR ESTER M-1695 (manufactured by Mitsubishi Chemical Corporation) as a surfactant were weighed to a total of 5 kg, and the weighed materials were stirred using THREE-ONE MOTOR (manufactured by Shinto Scientific Co., Ltd.) for 30 minutes to be completely dissolved.

Oil phase: 1 kg of coconut oil (product name: ORGANIC PREMIUM COCONUT OIL (M041), manufactured by COCOWELL CORPORATION) as oil and/or fat was weighed.

Membrane emulsification was performed using a pipe-shaped SPG membrane (manufactured by SPG Technology Co., Ltd., pore size of 50 μm) with an aqueous phase as a continuous phase and an oil phase as a dispersed phase. Specifically, the pipe-shaped SPG membrane was inserted and disposed in a tubular container, and from one end to the other end of the container, the aqueous phase was allowed to flow at a flow rate of 50 mL/min inside the pipe-shaped SPG membrane (inner conduit), and the oil phase was allowed to flow at a flow rate of 10 mL/min outside the pipe-shaped SPG membrane (outer conduit (flow path between the container and the SPG membrane)).

As a result, an aqueous solution containing droplets containing oil and/or fat (hereinafter, also referred to as "droplet dispersion") was obtained.

Note that the droplet containing oil and/or fat had a particle diameter of 190 m and a CV value of 19%.

The particle diameter and CV value of the droplet containing oil and/or fat were measured by a transmission optical microscope.

The droplet dispersion collected in a Petri dish was observed with a transmission optical microscope and imaged at an objective magnification of 5 times. 200 or more images of the droplet containing oil and/or fat included in the screen obtained by imagining were selected, and an equivalent circle diameter of each droplet was calculated with image process software (for example, ImageJ). The equivalent circle diameter of each droplet refers to a diameter of a perfect circle corresponding to an area of the image of the droplet.

An arithmetic average value of the calculated equivalent circle diameters of the respective droplets was calculated, and the arithmetic average value was defined as an "average particle diameter of droplets containing oil and/or fat".

The CV value of the droplet containing oil and/or fat is a value determined by the following equation.

CV value (%) of droplet containing oil and/or fat=(Standard deviation of equivalent circle diameter of droplet containing oil and/or fat/average particle diameter of droplets containing oil and/or fat)×100

The standard deviation of the equivalent circle diameter of the droplet containing oil and/or fat is a standard deviation of the equivalent circle diameters of 200 droplets containing oil and/or fat calculated in the measurement of the average particle diameter of the droplets containing oil and/or fat.
(2) Oil and/or Fat Solidifying Step The droplet dispersion was added to a separatory funnel and then allowed to stand for 30 minutes. Since the droplet dispersion was separated into a phase containing a droplet containing oil and/or fat and an aqueous phase, the aqueous phase was discharged from the separatory funnel, and the phase containing the droplet containing oil and/or fat was recovered.

The recovered phase containing the droplet containing oil and/or fat was allowed to stand and cooled in a refrigerator having an internal temperature of 5° C. for 1 hour, and solidification of the oil and/or fat was performed, thereby obtaining an aqueous solution containing particles (hereinafter, also referred to as "particle-containing solution").
(3) Crosslinking Step 1 part by mass of sodium alginate (KIMICA ALGIN I-1, manufactured by KIMICA Corporation) as an edible ionically crosslinkable polymer, 0.5 parts by mass of RYOTO SUGAR ESTER M-1695 (manufactured by Mitsubishi Chemical Corporation) as a surfactant, and 98.5 parts by mass of tap water were mixed to obtain an aqueous solution containing an edible ionically crosslinkable polymer (hereinafter, also referred to as "ionically crosslinkable polymer solution").

100 parts by mass of the particle-containing solution was added to 100 parts by mass of the ionically crosslinkable polymer solution, and the mixture was slowly stirred with a stirrer (THREE ONE MOTOR, manufactured by Yamato Scientific Co., Ltd.), thereby obtaining a solution 1. The obtained solution 1 was poured into a stainless steel pad so that a thickness of the solution was 3 mm.

1 part by mass of calcium chloride (food additive grade, manufactured by FUJIFILM Wako Pure Chemical Corporation) as a salt containing cations was dissolved in 99 parts by mass of tap water to prepare an aqueous solution 1 containing cations. The aqueous solution 1 containing the same mass of cations as the solution 1 contained in a stainless pad was poured into the stainless pad, and the mixed solution was allowed to stand in a refrigerator having an internal temperature of 5° C. for 2 hours to crosslink (gel) the edible ionically crosslinkable polymer, thereby obtaining a crude fat mass composition.

The crude fat mass composition was washed with tap water, moisture on a surface was wiped off with KIM TOWEL (registered trademark), and the wiped crude fat mass composition was cut into bars of about 1 mm×1 mm×30 mm. Oil and/or fat attached to the surface of the crude fat mass composition was washed with edible ethanol to obtain a fat mass composition.

Example 2-4: Production of Chunk Meat-Like Meat Alternative 4

Figure 6:
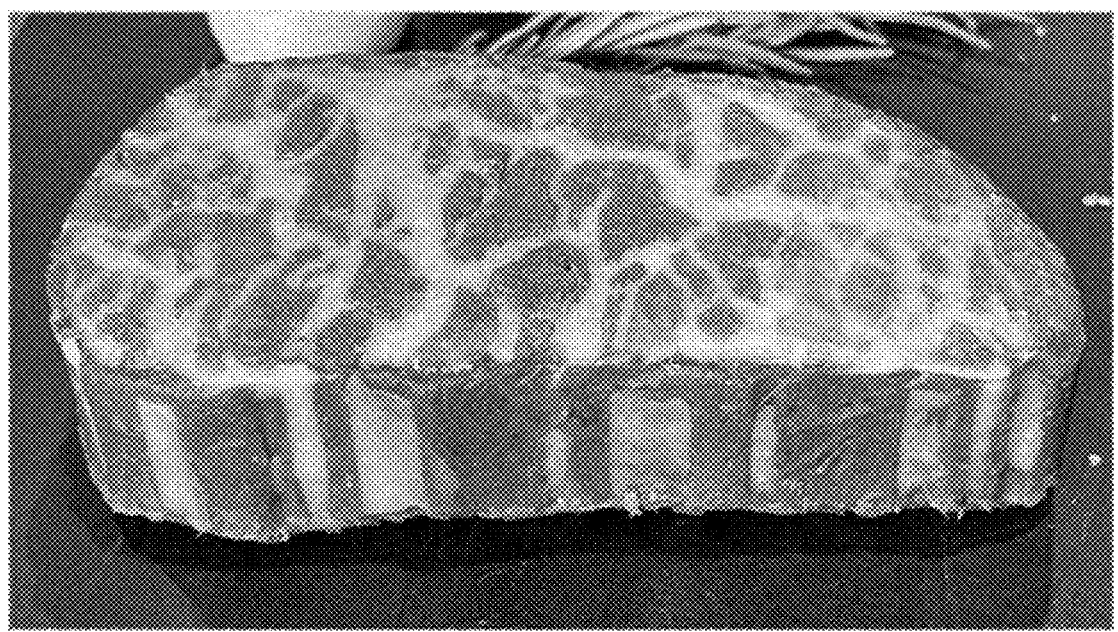
FIG. 6 is a schematic perspective view showing an example of a chunk meat-like meat alternative according to the disclosure.

A chunk meat-like meat alternative having a marbled pattern (chunk meat-like meat alternative 4) was obtained by the same procedure as that of Example 2-3, except that (Third Step) was changed to the following procedure. FIG. 6 illustrates the obtained chunk meat-like meat alternative having a marbled pattern.

Note that it was confirmed that a water-in-oil emulsion was contained in a portion having the marbled pattern.
(Third Step)

The stretched mixture was cut so as to have a fillet shape of steak, thereby obtaining a molded product. At this time, the stretched mixture was cut so that the fiber axis direction of the fiber bundle-shaped textured protein contained in the molded product was oriented in a direction orthogonal to a thickness direction of the molded product. The cut stretched mixture was placed in a mold having uneven grooves, and grooves similar to the fat shape of marbled meat were formed in the surface of the cut stretched mixture.

The solution 1 (the solution 1 was the gelling emulsion prepared by the same procedure as that of (3) Crosslinking Step in Example 2-3 (Preparation of Fat Mass Composition)) was applied to the formed grooves. The molded product to which the solution 1 was applied was immersed in the aqueous solution 1 containing cations (the aqueous solution 1 was the aqueous solution containing a gelling accelerator prepared by the same procedure as that of (3) Crosslinking Step in Example 2-3 (Preparation of Fat Mass Composition)) to gel the ionically crosslinkable polymer contained in the solution 1, thereby obtaining a molded product in which the solution 1 was gelled. The molded product obtained by gelling the solution 1 was vacuum-pouched and then heated for 1 minute so that the temperature inside the molded product was 75° C. Thereafter, the molded product was rapidly cooled with ice water to obtain a chunk meat-like meat alternative having a marbled pattern.

Comparative Example 2-1: Production of Chunk Meat-Like Meat Alternative C1

A chunk meat-like meat alternative C1 was obtained by the same procedure as that of Example 2-1, except that the vegetable protein binder was changed from the vegetable protein binder 1 to the vegetable protein binder C1 in (First Step).

Comparative Example 2-2: Production of Chunk Meat-Like Meat Alternative C2

A chunk meat-like meat alternative C2 was obtained by the same procedure as that of Example 2-1, except that the vegetable protein binder was changed from the vegetable protein binder 1 to the vegetable protein binder C2 in (First Step).

Comparative Example 2-3: Production of Chunk Meat-Like Meat Alternative C3

As a result of producing a chunk meat-like meat alternative C3 by the same procedure as that of Example 2-1, except that the vegetable protein binder was changed from the vegetable protein binder 1 to the vegetable protein binder C3 in (First Step), binding was insufficient.

Evaluation (Visual Evaluation)

The chunk meat-like meat alternative obtained in each Example was cooked on a hot plate at 200° C., and then the following evaluations were visually performed by ten panelists.

—Visual Evaluation after Cooking ("Appearance after Cooking" in Table 1)—

It was evaluated whether or not the chunk meat-like meat alternative after cooking had an appearance similar to steak meat, and the number of panelists who answered in the affirmative was counted.

—Visual Evaluation of Cross Section After Cooking ("Cross Section After Cooking" in Table 1)—

The chunk meat-like meat alternative after cooking was cut in the thickness direction, it was evaluated whether or not a cut surface had an appearance similar to a cut surface of steak meat after cooking, and the number of panelists who answered in the affirmative was counted.

(Texture Evaluation)

Ten panelists ate the chunk meat-like meat alternative after cooking, whether or not the meat had a texture similar to that of steak meat after cooking was evaluated, and the number of panelists who answered in the affirmative was counted.

(Evaluation Criteria)

The evaluation criteria for each evaluation were as follows. Note that the visual evaluation after cooking and the visual evaluation of the cross section after cooking were evaluated according to the following (Evaluation Criteria-1), and the texture evaluation was evaluated according to the following (Evaluation Criteria-2).

(Evaluation Criteria-1)

S: Nine or more panelists answered in the affirmative.
A: Seven or eight panelists answered in the affirmative.
B: From four to six panelists answered in the affirmative.
C: Three or less panelists answered in the affirmative.

(Evaluation Criteria-2)

A: Seven or more panelists answered in the affirmative.
B: From four to six panelists answered in the affirmative.
C: Three or less panelists answered in the affirmative.

TABLE 1

| | Vegetable protein binder | | | | Chunk meat-like meat alternative | | | | Evaluation | | |
|---|---|---|---|---|---|---|---|---|---|---|---|
| | Kind of vegetable protein binder | Kind of thermally irreversible gel-forming poly-saccharide | Kind of thermally reversible gel-forming poly-saccharide | Kind of gelation retardant | Textured protein Fibrous sponge | Fiber axis direction of textured protein | Content (% by mass) of poly-saccharide | Presence of absence of water-in-oil emulsion | Appearance after cooking | Cross section after cooking | Texture evaluation |
| Example 2-1 | 1 | Sodium alginate | Carrageenan | Sodium pyrophosphate | Fibrous | Thickness direction | 7.7% | Absence | A | A | A |
| Example 2-2 | 2 | LM pectin | Carrageenan | Sodium pyrophosphate | Fibrous | Thickness direction | 7.7% | Absence | A | A | A |
| Example 2-3 | 1 | Sodium alginate | Carrageenan | Sodium pyrophosphate | Fibrous | Thickness direction | 7.1% | Absence | A | S | A |
| Example 2-4 | 1 | Sodium alginate | Carrageenan | Sodium pyrophosphate | Fibrous | Thickness direction | 7.0% | Presence | S | S | A |
| Comparative Example 2-1 | C1 | None | Carageenan | None | Fibrous | Thickness direction | 7.7% | Absence | C | C | C |
| Comparative Example 2-2 | C2 | Sodium alginate | None | Sodium pyrophosphate | Fibrous | Thickness direction | 7.7% | Absence | A | B | C |
| Comparative Example 2-3 | C3 | Sodium alginate | None | None | Fibrous | — | 7.79% | Absence | Insufficient binding | | |

The abbreviations in the table will be explained below.

Fiber axis direction of textured protein: A case in which the fiber axis direction of the fiber bundle-shaped textured protein contained in the chunk meat-like meat alternative is oriented in one direction is described as "thickness direction" or "width direction" depending on the orientation direction. A case in which the fiber axis direction of the fiber bundle-shaped textured protein contained in the chunk meat-like meat alternative is not oriented in one direction is described as "absence".

Note that "thickness direction" means that the fiber axis direction of the fiber bundle-shaped textured protein is oriented in the thickness direction of the chunk meat-like meat alternative.

Note that "width direction" means that the fiber axis direction of the fiber bundle-shaped textured protein is oriented in a direction orthogonal to the thickness direction of the chunk meat-like meat alternative.

"-" described in Comparative Example 2-3, which indicates that the chunk meat-like meat alternative C3 obtained in Comparative Example 2-3 was not observed because the binding was insufficient and the shape of the mass was not maintained.

Content (% by mass) of polysaccharide means a content of a polysaccharide including a thermally irreversible gel-forming polysaccharide and a thermally reversible gel-forming polysaccharide with respect to an entirety of the chunk meat-like meat alternative.

From the results described above, it can be appreciated that the vegetable protein binder of each of Examples has moldability and maintains the shape of the chunk meat-like meat alternative by performing a heat treatment, and thus, a chunk meat-like meat alternative having a texture close to a texture of livestock meat after cooking can be obtained.

REFERENCE SIGNS LIST

1 First step mixture
2, 22, 23, 32, 42 Set of rod-like rollers
43 Spiral uneven shape
4 Stretched mixture C Protruding portion
D Portion without protrusion The disclosure of Japanese Patent Application No. 2022-040837 filed on Mar. 15, 2022 is incorporated herein by reference in their entirety.

All literatures, patent applications, and technical standards described in the disclosure are incorporated herein by reference to the same extent as if each individual literature, patent application, or technical standard was specifically and individually indicated to be incorporated by reference.

What is claimed is:

1. A vegetable protein binder for chunk meat alternative, comprising:
    a polysaccharide comprising a thermally irreversible gel-forming polysaccharide and a thermally reversible gel-forming polysaccharide that is an elastic solid at 25° C. and solated when heated,
    wherein the content of thermally irreversible gel-forming polysaccharide is from 10% to 90% by mass with respect to an entirety of vegetable protein binder, and
    wherein the content of thermally reversible gel-forming polysaccharide is from 10% to 90% by mass with respect to the entirety of vegetable protein binder;
    a gelation retardant, which is a chelating agent; and
    a divalent or higher-valent metal cation as a gelling agent,
    wherein the vegetable protein binder provides a fibrous fiber bundle-shaped textured protein having a livestock meat muscle-like texture in the chunk meat alternative,
    wherein a content of the gelation retardant is from 0.1% by mass to 20% by mass with respect to the entirety of the polysaccharide consisting of the thermally irreversible gel-forming polysaccharide and the thermally reversible gel-forming polysaccharide, and
    wherein; the chelating agent is at least one selected from the group consisting of aminocarboxylic acids, condensed phosphoric acids, and salts thereof.

2. The vegetable protein binder for chunk meat alternative according to claim 1, wherein the thermally irreversible gel-forming polysaccharide is at least one selected from the group consisting of alginic acid and pectin.

3. The vegetable protein binder for chunk meat alternative according to claim 1, wherein the chelating agent comprises at least one selected from the group consisting of iminodiacetic acid (IDA), nitrilotriacetic acid (NTA), pyrophosphoric acid, tripolyphosphoric acid, and salts thereof.

4. The vegetable protein binder for chunk meat alternative according to claim 3, wherein the chelating agent is pyrophosphate.

5. The vegetable protein binder for chunk meat alternative according to claim 1, wherein the thermally reversible gel-forming polysaccharide is carrageenan.

6. The vegetable protein binder for chunk meat alternative according to claim 1, wherein the divalent or higher-valent metal cation comprises at least one selected from the group consisting of a calcium ion, a magnesium ion, an iron(II) ion, a copper (II) ion, a zinc ion, a manganese ion, an aluminum ion, and an iron(III) ion.

* * * * *